US008781892B2

(12) United States Patent
Martinez et al.

(10) Patent No.: US 8,781,892 B2
(45) Date of Patent: Jul. 15, 2014

(54) DIGITAL MEDIA BENEFIT ATTACHMENT MECHANISM

(75) Inventors: Ronald Martinez, San Francisco, CA (US); Balaji Ravindran, Los Angeles, CA (US); Chris Kalaboukis, Los Gatos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 2074 days.

(21) Appl. No.: 11/529,814

(22) Filed: Sep. 29, 2006

(65) Prior Publication Data

US 2008/0082405 A1   Apr. 3, 2008

(51) Int. Cl.
*G06Q 30/00*   (2012.01)

(52) U.S. Cl.
CPC ..................................... *G06Q 30/00* (2013.01)
USPC ...................... 705/14.17; 705/14.1; 705/14.73

(58) Field of Classification Search
CPC   G06Q 30/00; G06Q 30/0207; G06Q 30/0215
USPC ........................ 705/10, 14, 14.1, 14.17, 14.73
See application file for complete search history.

(56) References Cited

U.S. PATENT DOCUMENTS

| | | | |
|---|---|---|---|
| 5,963,915 A | 10/1999 | Kirsch | |
| 6,378,075 B1 * | 4/2002 | Goldstein et al. | 726/5 |
| 6,457,038 B1 * | 9/2002 | Defosse | 709/200 |
| 6,496,857 B1 * | 12/2002 | Dustin et al. | 709/219 |
| 6,505,171 B1 * | 1/2003 | Cohen et al. | 705/26 |
| 6,650,761 B1 * | 11/2003 | Rodriguez et al. | 382/100 |
| 6,760,916 B2 * | 7/2004 | Holtz et al. | 725/34 |
| 6,978,263 B2 | 12/2005 | Soulanille | |
| 6,983,272 B2 | 1/2006 | Davis | |
| 7,013,289 B2 * | 3/2006 | Horn et al. | 705/26 |
| 7,057,591 B1 * | 6/2006 | Hautanen et al. | 345/87 |
| 7,424,543 B2 * | 9/2008 | Rice, III | 709/229 |
| 7,509,377 B2 * | 3/2009 | Harvey et al. | 709/206 |
| 2002/0052841 A1 * | 5/2002 | Guthrie et al. | 705/40 |
| 2002/0073043 A1 * | 6/2002 | Herman et al. | 705/64 |
| 2003/0028433 A1 * | 2/2003 | Merriman et al. | 705/14 |
| 2005/0108033 A1 * | 5/2005 | Everett-Church | 705/1 |
| 2006/0015904 A1 * | 1/2006 | Marcus | 725/46 |
| 2006/0265344 A1 * | 11/2006 | Woods | 707/1 |
| 2006/0287916 A1 * | 12/2006 | Starr et al. | 705/14 |

(Continued)

FOREIGN PATENT DOCUMENTS

JP   2005148949 A   *   6/2005   .............. G01V 8/10

OTHER PUBLICATIONS

Goldfarb, J., *Publishers aim for some control of search results*, Copyright © 2006 Reuters Limited, http://news.yahoo.com/s/nm/20060922/wr_nm/media_publishers_search_dc_1&printer=1;... 9/25/2006Fri, Sep. 22, 2006.

(Continued)

*Primary Examiner* — John G Weiss
*Assistant Examiner* — Adam Chornesky
(74) *Attorney, Agent, or Firm* — James J. DeCarlo; Greenberg Traurig, LLP

(57) ABSTRACT

Particular embodiments of the present invention are related to a digital media benefit attachment mechanism for generating or attaching revenue rights and other benefits to one or more entities associated with socially distributed media.

32 Claims, 27 Drawing Sheets

(56) References Cited

U.S. PATENT DOCUMENTS

| | | |
|---|---|---|
| 2008/0082405 A1* | 4/2008 | Martinez et al. ............... 705/14 |
| 2008/0082904 A1 | 4/2008 | Martinez |
| 2008/0082905 A1 | 4/2008 | Martinez |
| 2007/0035764 A1* | 2/2007 | Aldrich et al. ............... 358/1.15 |
| 2007/0162379 A1* | 7/2007 | Skinner ............................ 705/37 |
| 2008/0040301 A1* | 2/2008 | Sadagopan et al. ............ 706/16 |

OTHER PUBLICATIONS

You Tube, *Broadcast Yourself*, Copyright © 2006 YouTube, Inc., L:\Firm001\INTELLECTUALPROPERTY\MJS\SPOLYAR LAW FIRM\Yahoo-6569\Prosecution_Files\54093US1_SocialMediaRights\PriorArt\YouTube-Broadcast Yourself.htm, 2006.

* cited by examiner

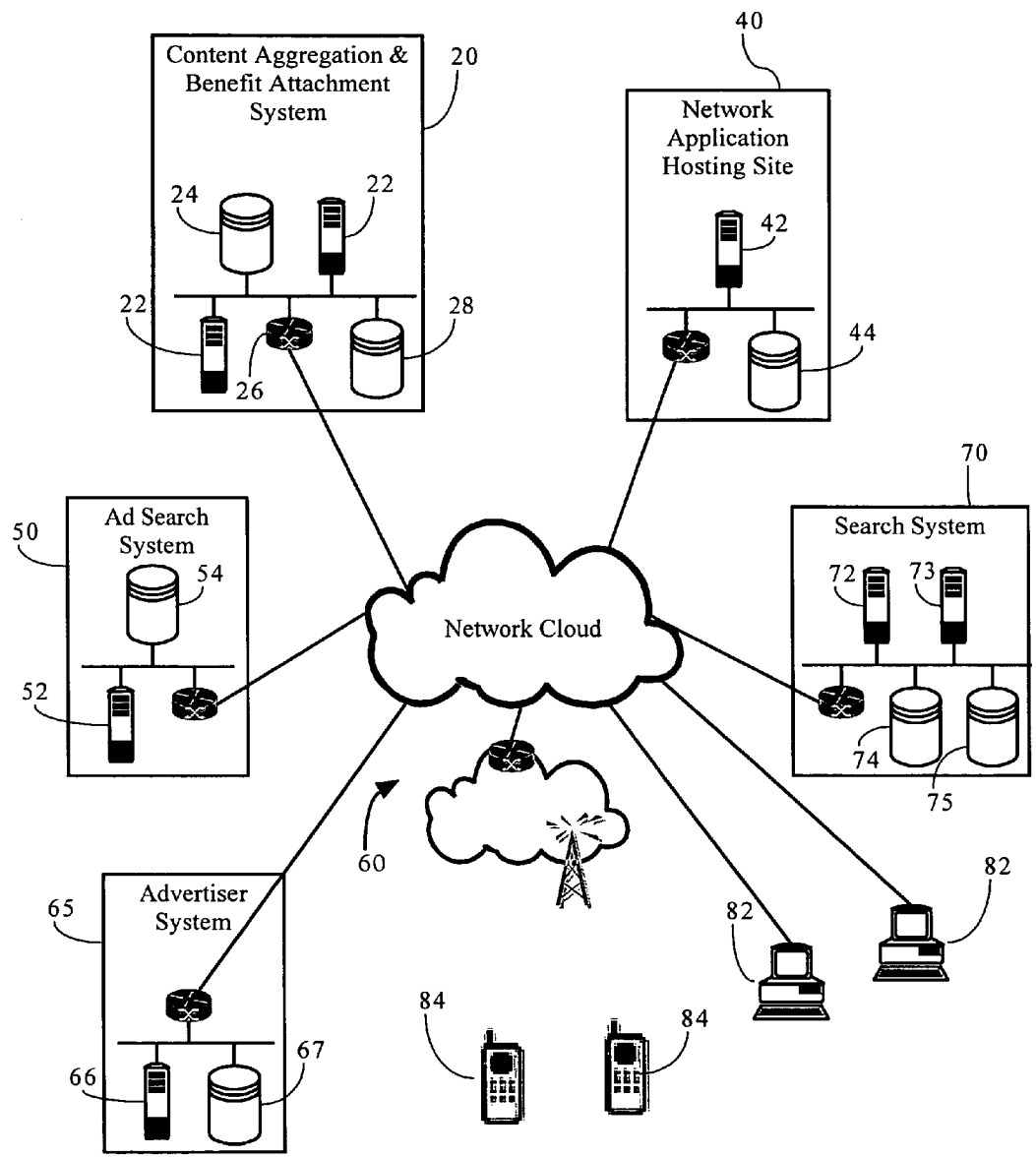
Fig._1A

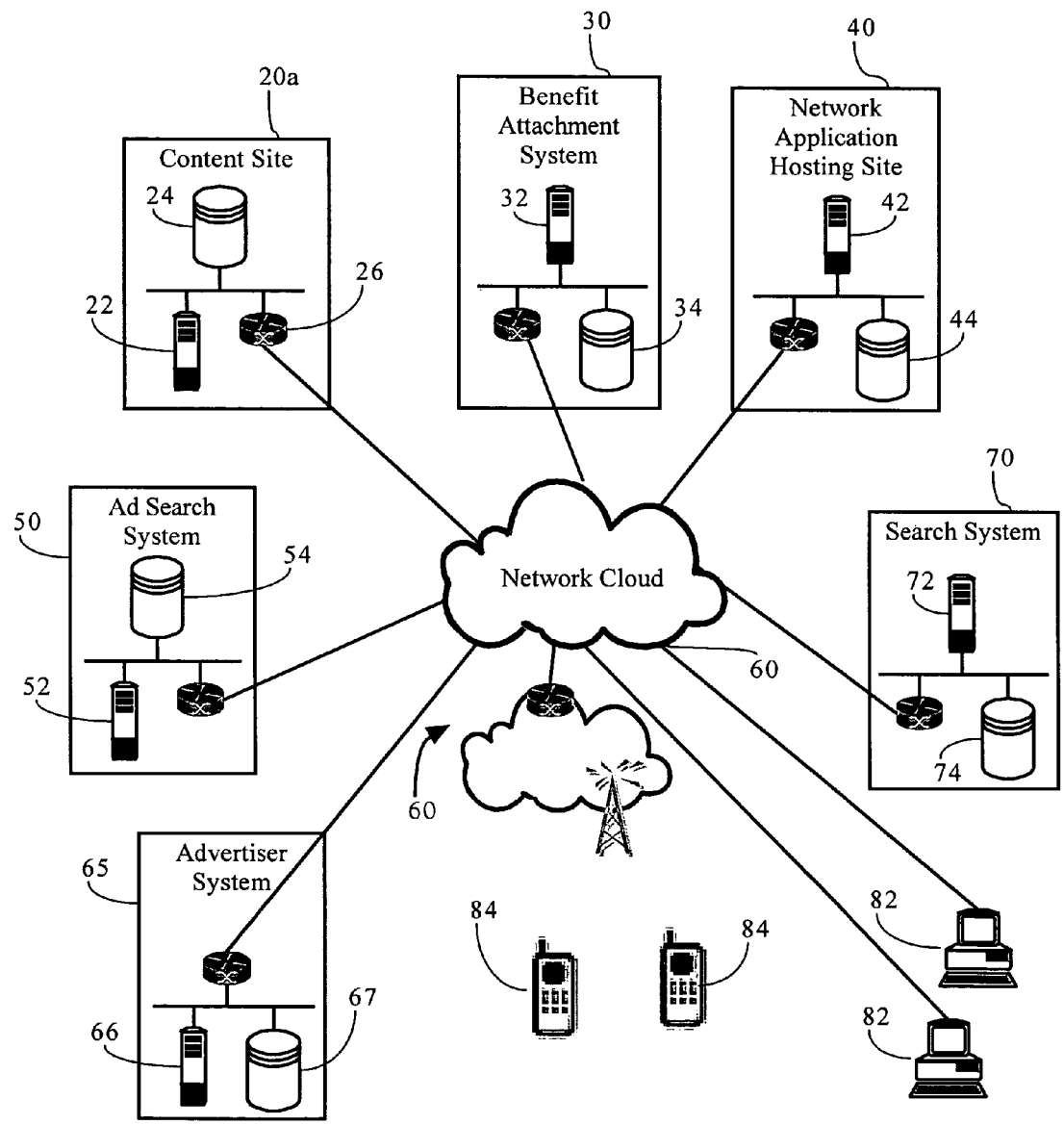
Fig._1B

```
<p><img width="380" border="2" src="http://static.flickr.com/
81/241933979_f838b26575.jpg?v=0" style="margin: 0px;" />           500
<br />
```

```
| <a href="http://www.flickr.com/people/48153537@N00/"             502
title="See the maker or owner of this item">By...</a>
```

```
| <a href="http://www.flicker.ba.com/?redrct=www.eucproducts.com/?OVRAW=leaf%     504
20eucalyptus&OVKEY=eucalyptus%20leaf&OVMTC=standard"
title="Find out more!">Ad</a> 
```

```
| <a href="http://search.yahoo.com/search?p=eucalyptus+leaf"       506
title="Search for this item...">Search...</a> |</p>
```

512          514              510
```
<p><img width="380" border="2" src="http://static.flickr.com/     500
81/241933979_f838b26575.jpg?v=0" style="margin: 0px;" />
<br />
```
            530                    516
                                                                  502
```
| <a href="http://www.flickr.com/people/48153537@N00/"             504
title="See the maker or owner of this item">By...</a>
```
                                                    541      542
      544              540
```
| <a href="http://www.flicker.ba.com/?redrct=www.eucproducts.com/?OVRAW=leaf%
20eucalyptus&OVKEY=eucalyptus%20leaf&OVMTC=standard"
title="Find out more!">Ad</a> 
```
                            550
                                                                  506
```
| <a href="http://search.yahoo.com/search?p=eucalyptus+leaf"
title="Search for this item...">Search...</a> |</p>
```
                                                    552

Fig._6A

```
<p><img width="380" border="2"
    src="http://www.yahoo.ba.com/?ch=http://static.content.com/
81/241933979_f838b26575.jpg?v=0" style="margin: 0px;" />
<br />
```

```
| <a href="http://www.flicker.ba.com/?adid=GHOHWF7140703"
title="Find out more!">Ad</a> 
```

Fig._6C 504
576      570          574      575

```
| <a href="http://www.flickr.ba.com/?CEEId=ceeid;COId=coid;
redrct=www.eucproducts.com/?OVRAW=leaf%20eucalyptus&
OVKEY=eucalyptus%20leaf&OVMTC=standard;"
title="Find out more!">Ad</a> 
```

Fig._6D 504                                                577

```
| <a href="http://www.flickr.ba.com/?CEEId=ceeid;COId=coid;NAHId=nahid;
redrct=www.eucproducts.com/?OVRAW=leaf%20eucalyptus&
OVKEY=eucalyptus%20leaf&OVMTC=standard;"
title="Find out more!">Ad</a> 
```

| <a href="http://www.yahoo.ba.com/?CEEId=ceeid;COId=coid;(CHId=chid;)
redrct=www.eucproducts.com/?OVRAW=leaf%20eucalyptus&
OVKEY=eucalyptus%20leaf&OVMTC=standard;"
title="Find out more!">Ad</a>

Fig._6F 504 570 576 569

| <a href=("http://www.flickr.ba.com/?)(redrct)=(www.yahoo.ad.com/?)
(p=eucalyptus+leaf)(CEEId=ceeid;COId=coid;"
title="Find out more!">Ad</a> 
568

Fig._6G 506 574

| <a href="http://search.yahoo.com/search?(CEEId=ceeid)
p=eucalyptus+leaf"; title="Search for this item...">Search...</a> |</p>

Fig._6H 506 575

| <a href="http://search.yahoo.com/search?CEEId=ceei(d;COId=coid)
p=eucalyptus+leaf"; title="Search for this item...">Search...</a> |</p>

Fig._6I 506 577

| <a href="http://search.yahoo.com/search?CEEI(d;NAHId=nahid)
p=eucalyptus+leaf"; title="Search for this item...">Search...</a> |</p>

Fig._6J

| <a href="http://www.yahoo.search.com/?bas=bas.com;CEEId=ceeid;COId=coid; p=eucalyptus+leaf title="Search for this item...">Search...</a> |</p>

| <a href="http://www.flickr.ba.com/?CEEId=ceeid;COId=coid; redrct=http://search.yahoo.com/search?p=eucalyptus+leaf" title="Search for this item...">Search...</a> |</p>

<a href="http://www.flicker.ba.com/?redrct=www.eucproducts.com/?OVRAW=leaf%20eucalyptus&OVKEY=eucalyptus%20leaf&OVMTC=standard" img width="380" border="0" src="http://static.flickr.com/81/241933979_f838b26575.jpg?v=0" style="margin: 0px;"/> </a>

| <a href="http://www.flickr.ba.com/?CEEId=ceeid;COId=coid;ContId=contid; redrct=www.eucproducts.com/?OVRAW=leaf%20eucalyptus& OVKEY=eucalyptus% 20leaf&OVMTC=standard;" title="Find out more!">Ad</a>

```
<script language="JavaScript" type="text/javascript">
<!--
ctxt_content_loc = www.flickr.com;
ctxt_content_id = "9774908300";
ctxt_cee_id = "ceeid";
ctxt_co_id = "coid";
ctxt_ad_width = 728;
ctxt_ad_height = 90;
ctxt_tag1 = "eucalyptus";
ctxt_tag2 = "leaf";
// -->
</script>
<script language="JavaScript" src="http://ypn-js.yahoo.com /js/ypn.js">
</script>
```

Fig._6N

```
<p><img width="380" border="2" src="http://static.flickr.com/
81/241933979_f838b26575.jpg?v=0;ceeID=ceeid" style="margin: 0px;" />
<br />
```
500

Fig._6P  574

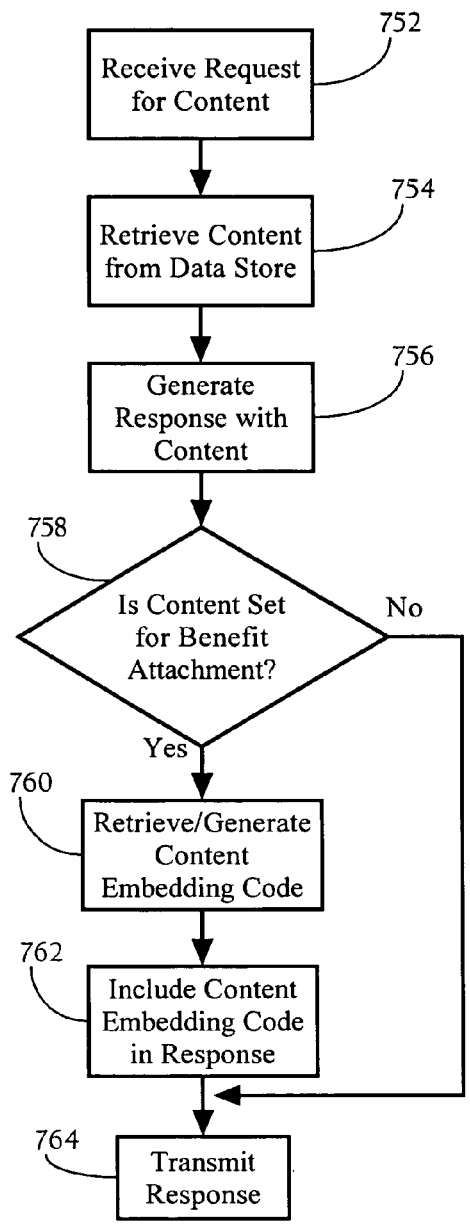
Fig._8
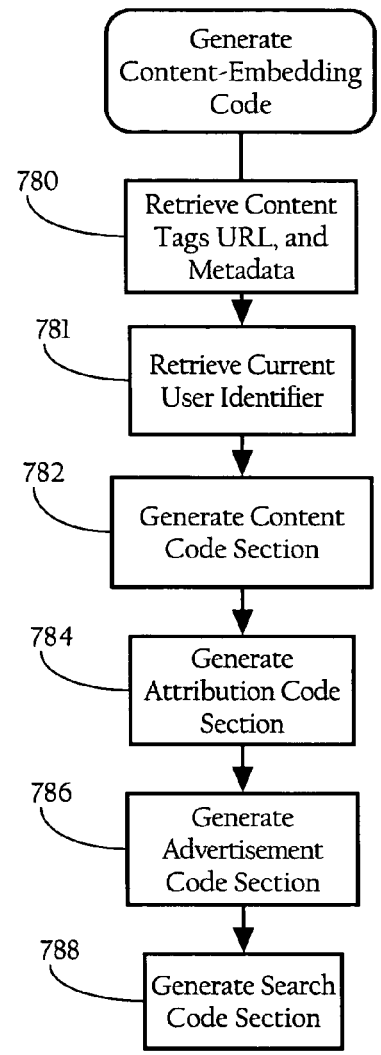
Fig._9A

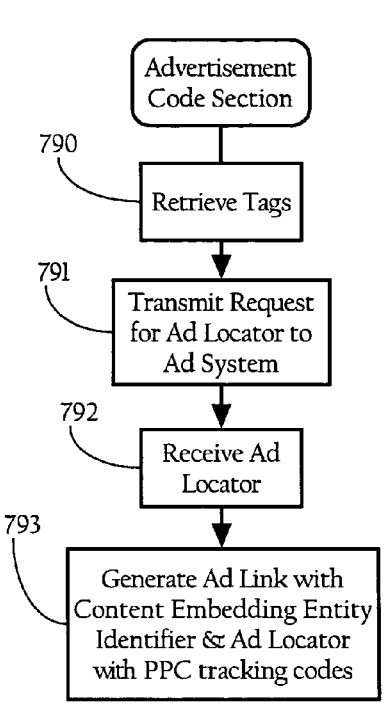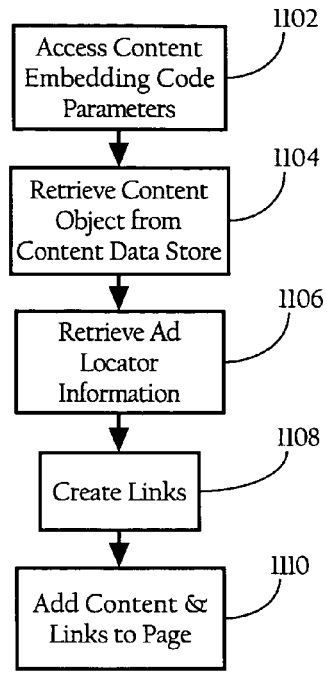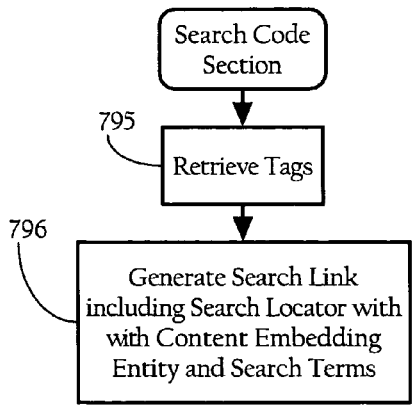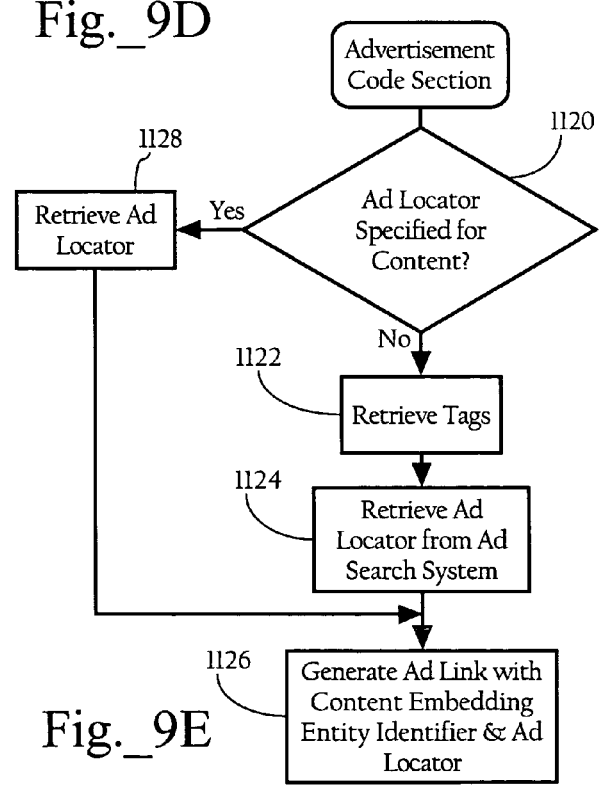
Fig._9B
Fig._9D
Fig._9C
Fig._9E

Fig._10

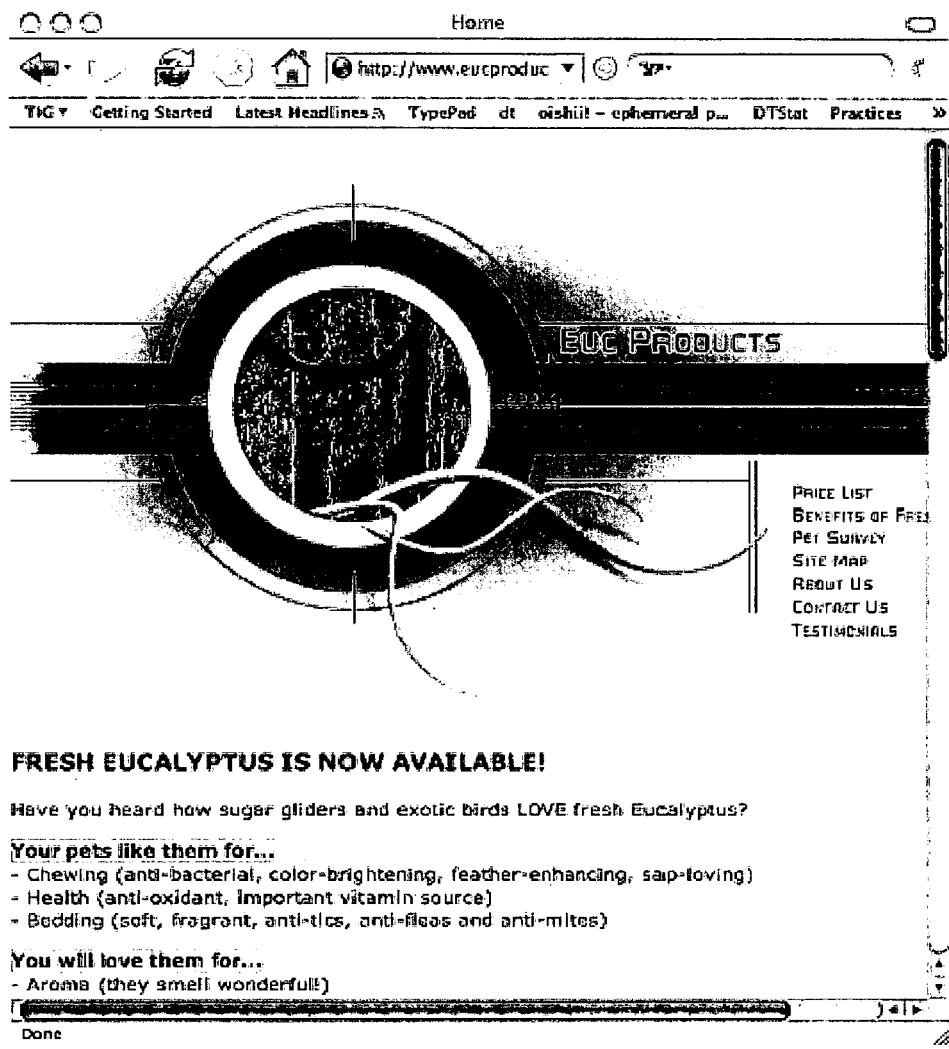
Fig._11

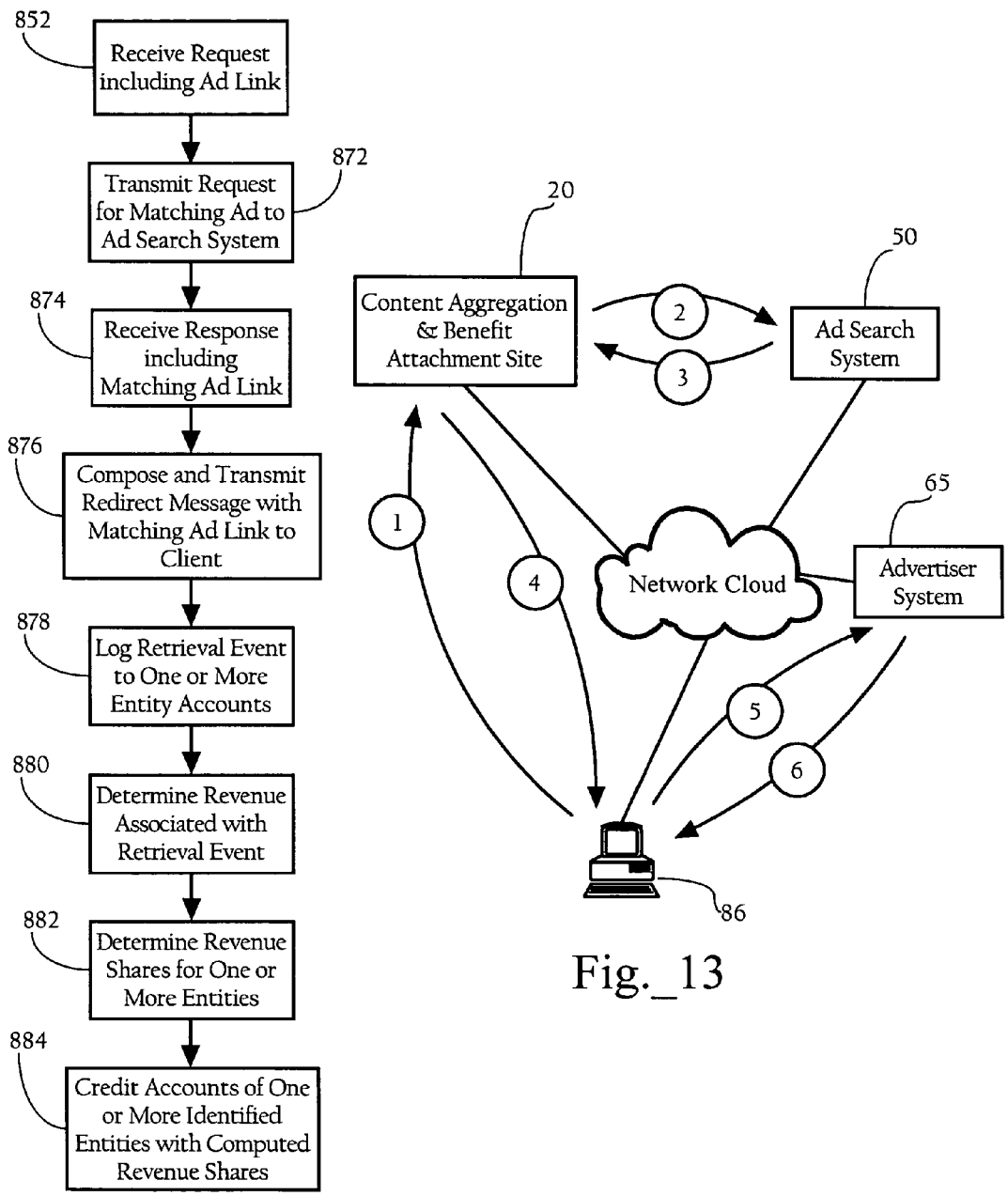
Fig._12C
Fig._13

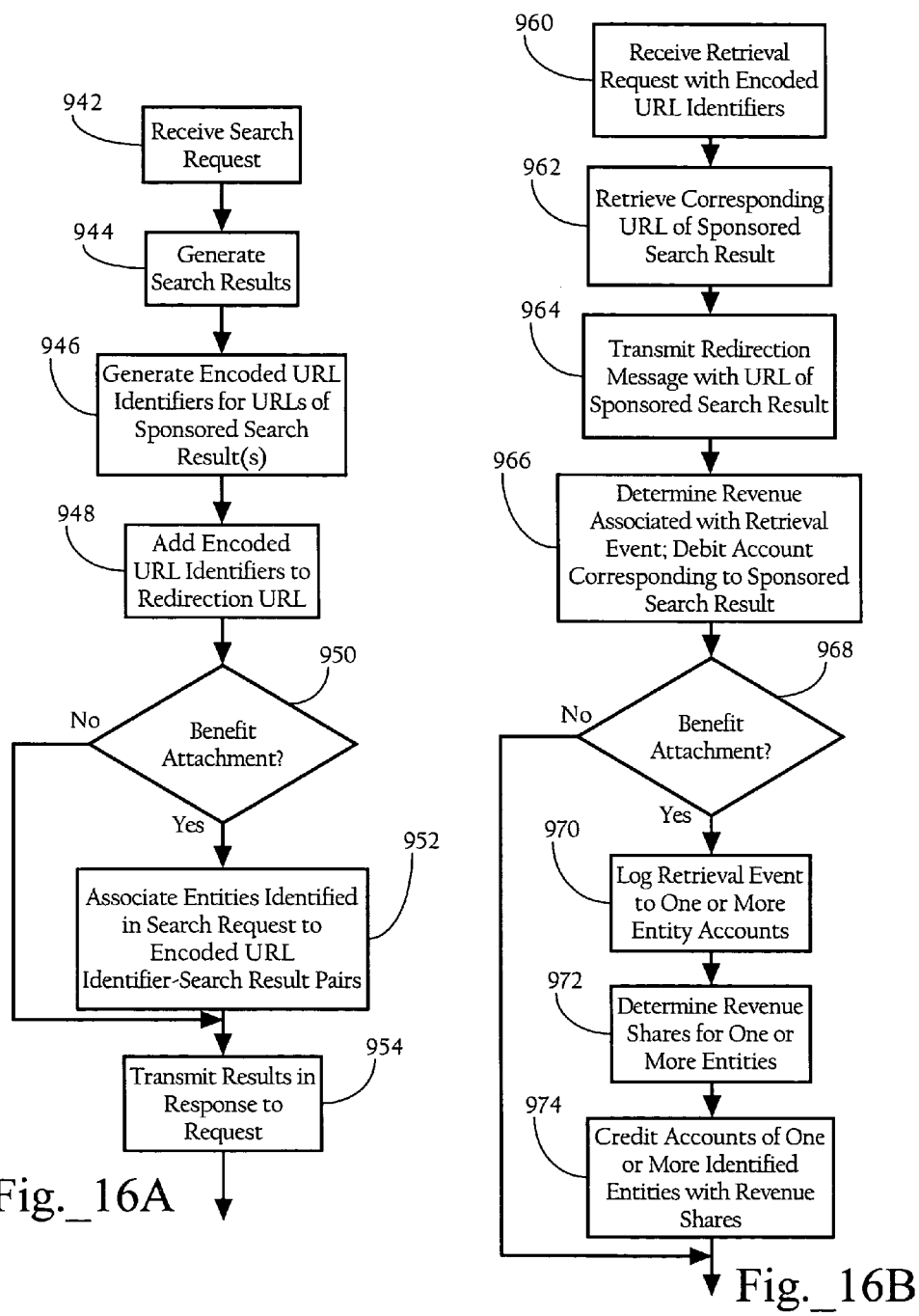

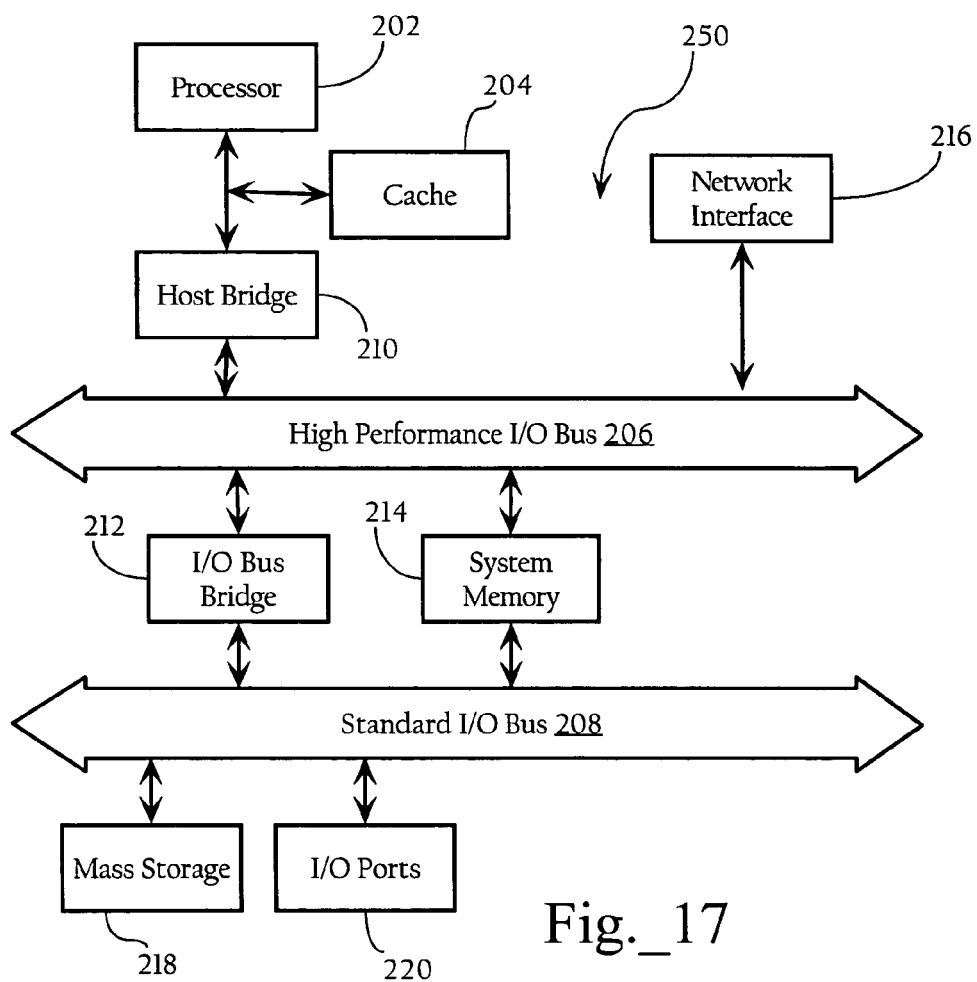
Fig._17

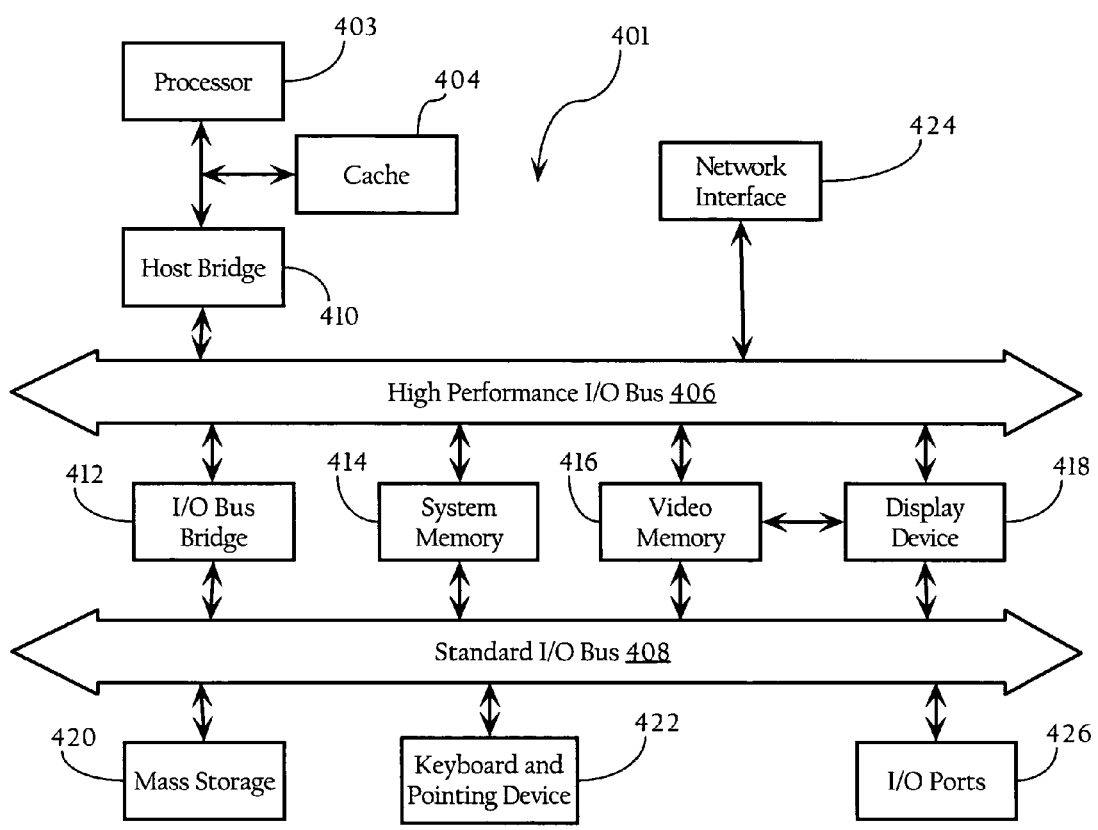
Fig._18

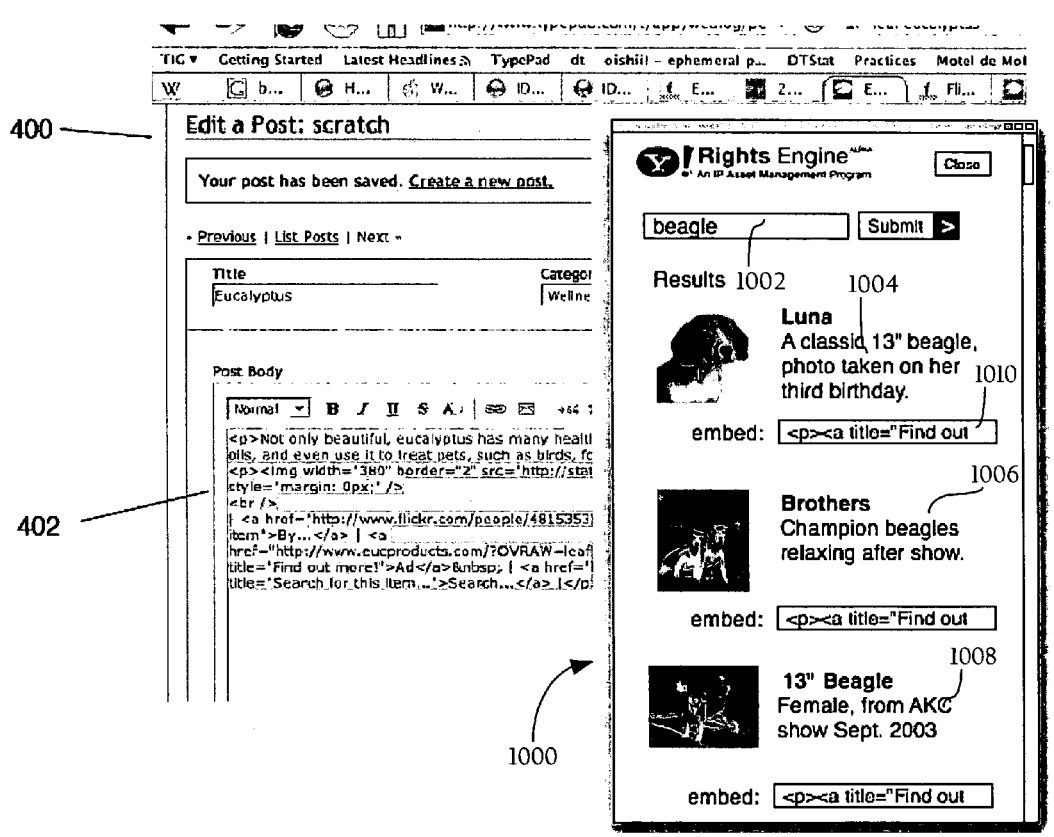
Fig._19

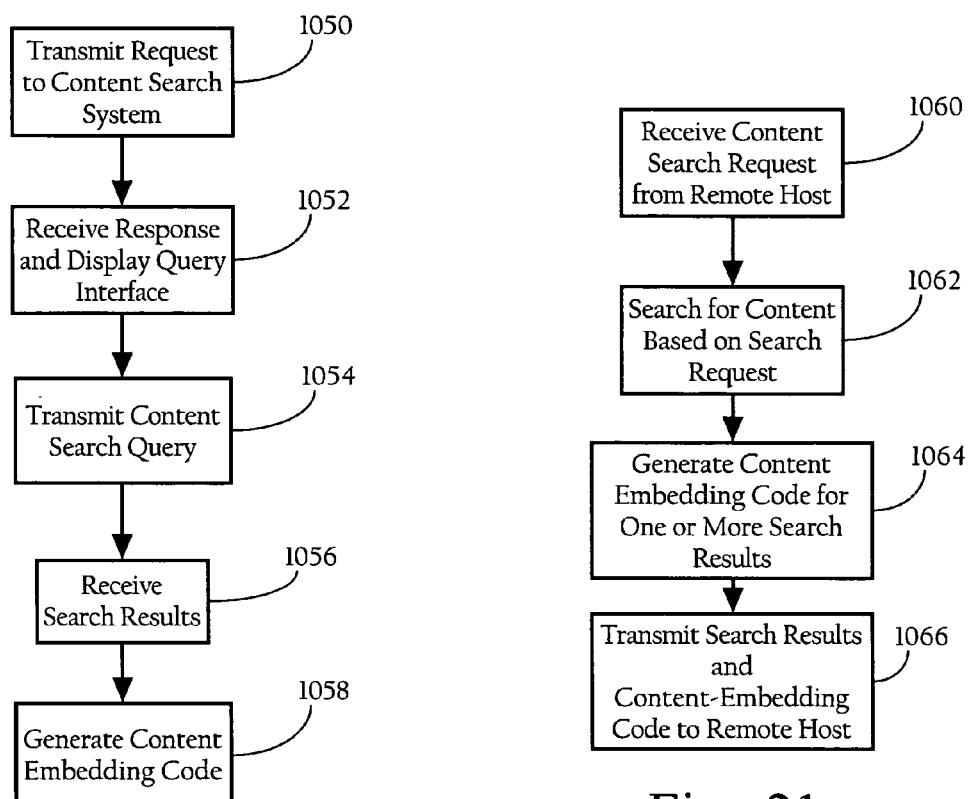

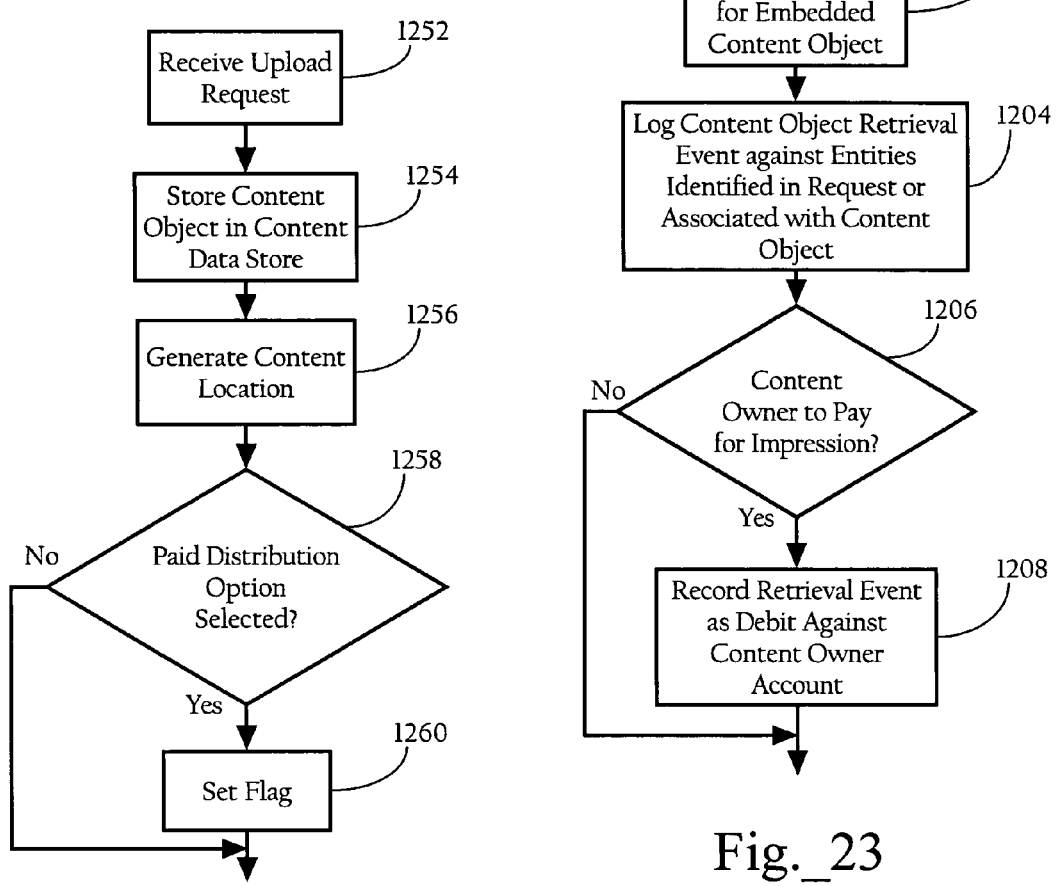

DIGITAL MEDIA BENEFIT ATTACHMENT MECHANISM

TECHNICAL FIELD

The present disclosure generally relates to distribution of multimedia content and other content over networks.

BACKGROUND

Interactive systems connected wide area networks, such as the Internet, have steadily evolved into vibrant mediums for social interaction and sharing of digital media. Indeed, an enormous amount of digital media generated by end users, media companies, and professional media creators is made available and shared across the Internet through web sites and uploading to various content hosting or aggregation systems and services (e.g., Flickr®, Yahoo!® Video, YouTube.com, etc.). End-users increasingly use or share media in a variety of on-line and interactive contexts. For example, an ever-increasing number of end-users create websites of various types, including blog pages, personalized social networking pages (such as Yahoo! 360, Facebook, or MySpace), that utilize digital media content, such as images, video, and music. Furthermore, digital media content is often found posted to online groups or forums, or other purpose-built sites, such as for small businesses, clubs, and special interest groups.

These two dynamics are closely related in that online media available on the Internet is often re-used or included: in the pages of web sites, social network sites, on-line forums, or other systems. For example, a user may create a blog about a topic of personal interest—e.g., beagles. When posting to the blog (creating a short text item), the user may include an image of a beagle that illustrates the point or subject of the post (e.g., beagle ear length). To locate an image, the user may access an image search engine and find a suitable image. To add the image to the blog post, the user may download that image to a hard drive or other data store, and then upload the image to the blog hosting site. Alternatively, if technically adept, the user may add HTML code to the blog post that will display the image in the post, causing the image to be loaded from its original location when the blog is viewed. Video and audio content may also be added to blogs or other network addressable resources, such as personal pages, in a similar manner.

DESCRIPTION OF THE DRAWINGS

FIG. 1A illustrates an example network environment in which particular implementations may operate.

FIG. 1B illustrates another example network environment in which particular implementations may operate.

FIG. 4 illustrates an example web page interface including uploaded digital media content and content-embedding code.

FIGS. 6A thru 6P set forth example content-embedding code and code sections.

FIG. 8 illustrates an example method, according to one particular implementation, directed to providing content-embedding code.

FIGS. 9A thru 9E provide example methods, according to particular implementations, directed to generating content-embedding code.

FIG. 10 illustrates an example web page including attribution information.

FIG. 11 illustrates an example web page including an advertisement.

FIGS. 12A thru 12C illustrate example methods directed to processing requests involving ad links according to particular implementations.

FIG. 13 is a schematic diagram illustrating an example message flow involving an ad link according to a particular implementation.

FIGS. 16A thru 16C illustrate example methods directed to processing requests involving search links according to particular implementations.

FIG. 17 is a schematic diagram illustrating an example computing system architecture that may be used to implement one or more of physical servers.

FIG. 18 is a schematic diagram illustrating an example computing system architecture that may be used to implement one or more of client systems.

FIG. 19 illustrates an example interface that facilitates content embedding operations.

FIG. 20 illustrates an example method facilitating insertion of content embedding code.

FIG. 21 illustrates an example method directed to searching for content and generating content-embedding code for one or more search results.

FIG. 22 illustrates an example method directed to uploading content objects.

FIG. 23 illustrates an example method directed to processing requests for embedded content objects.

DESCRIPTION OF PREFERRED EMBODIMENT(S)

A. Overview

Figure 2:
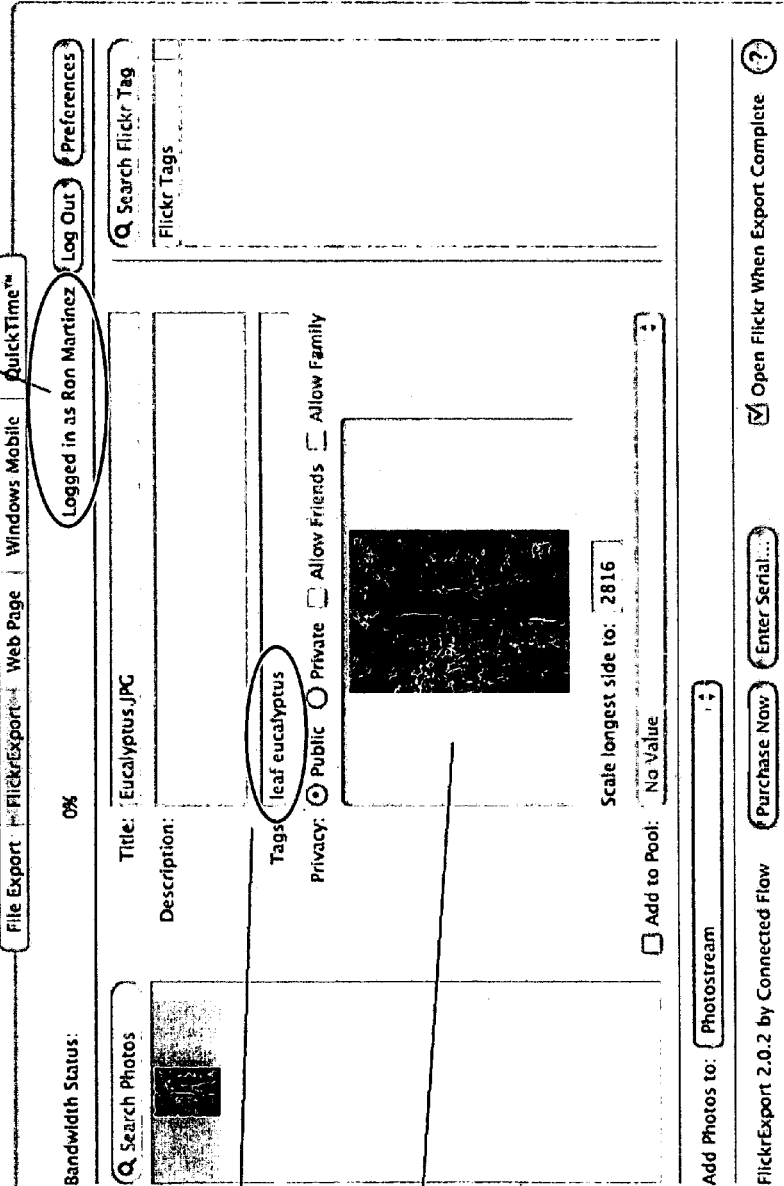
FIG. 2 illustrates an example user interface directed to uploading digital media content.

Particular embodiments of the present invention are related to a digital media benefit attachment mechanism for generating or attaching revenue rights and other benefits to one or more entities associated with socially distributed media. Particular implementations can involve content aggregation and distribution systems, advertising systems, and social media systems in a manner that promotes release and sharing of multimedia content over networks.

The present invention can be implemented in a variety of manners. In some particular implementations, one or more of the following events or processes can occur. In some implementations, a content owner may upload a digital content object to a network addressable system, such as a media aggregation site (an example being Yahoo!®'s Flickr® photo sharing system). The content owner may configure one or more tags, and optionally, provide identifying information of the content owner. The network addressable system stores the tags and related information in association with the uploaded content object. Users may access the network addressable system and uploaded content, for example, viewing uploaded content with a client application, such as a browser. In some particular implementations, the content is displayed with content-embedding code. In some implementations, content-embedding code is source code (such as HyperText Markup Language (HTML) code), or other machine-readable instructions, that a user may insert into an underlying data object (such as an HTML page). The content-embedding code, for example, can be inserted into an interface of an HTML editing application that creates or edits HTML pages, which can be published to a web server. The HTML editing application can be a stand-alone application executed on a host, or a network application hosted on a remote server, such as a blog server, personal page, etc. The content-embedding code, when accessed and executed in connection with the underlying data object, causes a processor to retrieve or otherwise access the content, and present one or more hyperlinks in association with the content. In some implementations, the hyperlinks, when activated, are operative to generate revenue or some other benefit to one or more entities associated with distribution, hosting or creation of the content. Particular implementations provide for different hyperlink types that can be used independently or in combination, such as attribution links, ad links, search links, and content sharing links. In one implementation, revenue generated by activation of one or more of these links (such as links to sponsored ads or content in search results) can be shared between one or more of the following entities content owners, content uploaders, content embedding entities, network application hosting service providers, content hosting service providers, search system providers, advertising system providers, or others. As discussed below, a variety of implementations are possible.

Particular implementations of the invention can be configured to achieve a variety of revenue models and benefit attachment schemes. Particular implementations of the invention allow for revenue sharing and distribution schemes involving distribution of digital media beyond traditional compensation schemes, where a content owner or provider is essentially compensated based on advertising displayed in connection with the content. Particular implementations of the invention provide novel revenue models that allow a vast array of social media systems, such as content aggregation sites and social network sites, to monetize one or more aspects of their operations in manners not currently realized. Particular implementations of the invention provide revenue models and compensation mechanism that provide added inducements to content creators and rights owners to release content into social media distribution networks. Other implementations of the invention facilitate the use and redistribution of digital media content among a plurality of users.

By providing incentives and facilitating mechanisms, such as content-embedding code, the process of finding and using media content can be simplified, resulting in improved work product, greater authorized use of content, and more revenues to one or more participating entities. The benefit attachment mechanisms described herein can be configured to provide a variety of advantages or features. In some implementations, the benefit attachment mechanisms described herein provide ways for content hosting systems, such as media aggregation sites, to be compensated when the media is used on any of a wide range of other sites. In addition, in some implementations, the benefit attachment mechanisms described herein may be configured to provide incentives for users to embed content in their own underlying content. In some particular implementations, the benefit attachment mechanisms described herein can be configured to provide incentives to content owners to upload content. In some implementations, the benefit attachment mechanism may provide incentives for media companies and individuals to make otherwise tightly controlled content available for use in derivative works such as social network pages or blogs, etc.

In the following description, specific details are set forth in order to provide a thorough understanding of particular implementations of the present invention. Other implementations of the invention may be practiced without some or all of specific details set forth below. In some instances, well known structures and/or processes have not been described in detail so that the present invention is not unnecessarily obscured.

A.1. Example Network Environment

Particular implementations of the invention operate in a wide area network environment, such as the Internet, including multiple network addressable systems. Network cloud 60 generally represents one or more interconnected networks, over which the systems and hosts described herein can communicate. Network cloud 60 may include packet-based wide area networks (such as the Internet), private networks, wireless networks, satellite networks, cellular networks, paging networks, and the like.

As FIG. 1A illustrates, a particular implementation of the invention can operate in a network environment comprising content aggregation and benefit attachment system 20, network application hosting site 40, ad search system 50, advertiser system 65, and search system 70. Although FIG. 1A illustrates the foregoing systems as separate systems, the functionality represented by each system may be combined into other systems. Furthermore, the functionality represented by each depicted system may be further separated. Still further, implementations of the invention may operate in network environments that include multiples of one or more of the individual systems and sites disclosed herein. In addition, other implementations may operate in network environments where one or more of the system described herein have been omitted. Client nodes 82, 84 are operably connected to the network environment via a network service provider or any other suitable means.

A.1.a. Content Aggregation and Benefit Attachment Systems

Content aggregation and benefit attachment system 20 is a network addressable system that stores content uploaded by one or more users. Content aggregation and benefit attachment system 20, in one implementation, includes functionality directed to the digital media benefit attachment mechanisms described herein. In one implementation, content aggregation and benefit attachment system 20 may be a media aggregation or sharing system, such as Flickr® photo sharing site, and similar variants. Content aggregation and benefit attachment system 20, in one implementation, comprises one or more physical servers 22 and content data store 24. The one or more physical servers 22 are operably connected to computer network 60 via a router 26. The one or more physical servers 22 host functionality that allows users to upload and retrieve content. In one implementation, the functionality hosted by the one or more physical servers may include web or HTTP servers, FTP servers, and the like.

Content data store 24 stores content as digital content data objects. A content data object or content object, in particular implementations, is an individual item of digital information typically stored or embodied in a data file or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Structurally, content data store 24 connotes a large class of data storage and management systems. In particular implementations, content data store 24 may be implemented by any suitable physical system including components, such as database servers, mass storage media, media library systems, and the like.

Physical servers 22 may also host functionality directed to the benefit attachment mechanisms described herein. For example, data store 28 may store user account information, corresponding to one or more of the entities described above, including user identifiers, passwords, addresses, preferences, financial account information, as well as pointers to uploaded content. In some implementations, one or more of the physical servers 22 may include functionality that generates content-embedding code that facilitates operations that assist content embedding entities in embedding available content into underlying resources. Physical servers 22 may support other process and message flows, as described below.

A variety of implementations are possible. For example, while FIG. 1A illustrates content aggregation and benefit attachment system 20 as an integrated system, this functionality may be implemented as separate systems. For example, as FIG. 1B illustrates, content site 20a may host uploaded content, while a separate benefit attachment system 30 may host content-embedding and other benefit attachment functionality. Benefit attachment system 30 may also host uploaded content as well.

A.1.b. Network Application Hosting Site

Network application hosting site 40 is a network addressable system that hosts a network application accessible to one or more users over a computer network. The network application may be an informational web site where users request and receive identified web pages and other content over the computer network. The network application may also be an on-line forum or blogging application where users may submit or otherwise configure content for display to other users. The network application may also be a social network application allowing users to configure and maintain personal web pages. The network application may also be a content distribution application, such as Yahoo! Music Engine®, Apple® iTunes®, podcasting servers, that displays available content, and transmits content to users. As FIG. 1A illustrates, network application hosting site 40 may comprise one or more physical servers 42 and a data store 44.

A.1.c. Search System

Search system 70 is a network addressable resource that provides search results responsive to queries transmitted from remote hosts. As discussed herein, the search terms may be embodied in search links created in connection with content-embedding code. In particular implementations, search system 70 provides one or more links to sponsored content in search result listings. Search system 70, in some implementations, includes one or more physical servers 72, 73 and data stores 74, 75. Search system 70, in some implementations, includes at least two types of servers, where both types have HTTP, HTTPS, SSL, FTP, and/or other functionality that allows remote access over a network. A first server type may be an account management server 72. The account management server 72 operates in connection with account management data store 74. The account management data store 74 contains advertiser account information. General-purpose browsers or special-purpose client applications, running on client nodes 82, may be used to access advertiser account information stored in account management data store 74. An advertiser may, through account management server 72 and an account residing on the account management data store 74, participate in a competitive bidding process with other advertisers. An advertiser may bid on any number of search terms relevant, for example, to the content of the advertiser's web site.

A second server type may be a search engine server 73. A search engine server 73 executes one or more search engine programs that permit users, upon navigating to the search engine web server URL or sites on other web servers capable of submitting queries to the search engine server 73, to enter queries to search for network resources of interest. In a particular implementation, the search engine server 73 may generate a search result list that includes, at least in part, relevant entries obtained from and formatted by the results of a bidding process conducted in connection with the account management server 22. The search engine server 73 may generate a list of hypertext links to documents or other resources that contain information relevant to search terms entered by a user. The search engine server 73 transmits this list, in the form of a web page, to the network user, where it is displayed on a browser or other client application running on a client node 82, 84.

In particular implementations, search engine server 73 operates in connection with a search data store 74 including search listing records used to generate search results in response to user queries. In addition, search engine server 73 may also be connected to the account management server 72. One or more of the search listings, in some implementations, correspond to a search term-bid pairing and contains information to conduct the online competitive bidding process. In some implementations, each search listing comprises a search term, a web site description, a URL, a bid amount, and a title. The search term may comprise one or more keywords which may be common words in English (or any other language). Each keyword in turn comprises a character string. The search term is the object of the competitive online bidding process. The advertiser selects a search term to bid on that is relevant to the content of the advertiser's web site. Ideally, the advertiser may select a search term that is targeted to terms likely to be entered by searchers seeking the information on the advertiser's web site, although less common search terms may also be selected to ensure comprehensive coverage of relevant search terms for bidding. The web site description may be a short textual description of the advertiser's web site and may be displayed as part of the advertiser's entry in a search result list. The search listing may also contain a title of the web site that may be displayed as the hyperlinked heading to the advertiser's entry in a search result list. The URL contains the Uniform Resource Locator address of the advertiser's web site. When the user clicks on the hyperlink provided in the advertiser's search result list entry, the URL is provided to the browser program. The browser program, in turn, accesses the advertiser's web site through the redirection mechanism discussed herein. The URL may also be displayed as part of the advertiser's entry in a search result list.

A bid amount may be a money amount bid by an advertiser for a listing. This money amount is deducted from the advertiser's prepaid account or is recorded for advertiser accounts that are invoiced for each time a search is executed by a user on the corresponding search term and the search result list hyperlink is used to refer the searcher to the advertiser's web site.

Higher bids generally receive more advantageous placement on the search result list page generated by the search engine server 73 when a search using the search term bid on by the advertiser is executed. In a particular implementation, the amount bid by an advertiser comprises a money amount that is deducted from the account of the advertiser for each time the advertiser's web site is accessed via a hyperlink on the search result list page. A user "clicks" on the hyperlink with a computer input device to initiate a retrieval request to retrieve the information associated with the advertiser's hyperlink. In some implementations, each access or "click" on a search result list hyperlink is redirected to the search engine web server 73 to associate the "click" with the account identifier for an advertiser. This redirect action, in one implementation, accesses account identification information coded into the search result link before accessing the advertiser's URL. The account identification information is recorded in the advertiser's account along with information from the retrieval request as a retrieval request event. The information obtained through this mechanism matches an account identifier with a URL and allows for account debit records to be maintained. Beyond Pay-Per-Click schemes, other monetization schemes are possible, such as Pay-Per-Impression.

In particular implementations, the search result list also includes non-paid or non-sponsored listings that are not placed as a result of advertiser bids and are generated by an algorithmic search engine. In one implementation, the non-paid search result listings follow, or are provided adjacent to, the paid or sponsored advertiser listings on the search results page.

When a user accesses a search query page provided by the search engine server 73 and executes a search request, the search engine server 73, in one implementation, generates and displays a search result list where the canonicalized entry in search term field of each search listing in the search result list matches the canonicalized search term query entered by the remote searcher. The canonicalization of search terms used in queries and search listings removes common irregularities of search terms entered by searches and web site promoters, such as capital letters and pluralizations, in order to generate relevant results. However, alternate schemes for determining a match between the search term field of the search listing and the search term query entered by the remote searcher are well within the scope of the present invention. For example, string matching algorithms known in the art may be employed to generate matches where the keywords of the search listing search term and the search term query have the same root but are not exactly the same (e.g., computing vs. computer). Alternatively a thesaurus database of synonyms may be used by the search engine server 24, so that matches may be generated for a search term having synonyms. Localization methodologies may also be employed to refine certain searches. For example, a search for "bakery" or "grocery store" may be limited to those advertisers within a selected city, zip code, or telephone area code. This information may be obtained through a cross-reference of the advertiser account database stored in account management data store 74.

Search result list entries may also show the rank value of the advertiser's search listing. The rank value is an ordinal value, preferably a number, generated and assigned to the search listing by search engine server 73. In some implementations, the rank value is assigned through a process that establishes an association between the bid amount, the rank, and the search term of a search listing. The process gathers search listings that match a particular search term, sorts the search listings in order from highest to lowest bid amount, and assigns a rank value to each search listing in order. The highest bid amount receives the highest rank value, the next highest bid amount receives the next highest rank value, proceeding to the lowest bid amount, which receives the lowest rank value. In some implementations, only the top N ranked search listings are provided in the first page of search results returned to the user.

In some implementations, the bidding process implemented by search system 70 may not distinguish between search queries submitted directly by users, and search queries resulting from activation of ad links contained in content-embedding code. In other implementations, search system 70 may support a separate bidding process for keywords contained in search queries resulting from activation of ad links in content-embedding code.

A.1.d. Ad Search System

Ad search system 50 is a network addressable system that is operative to select an ad in response to a request from a remote system, and return ad content or a URL to ad content. The ad search system may be a central system accessible to one or more systems over a wide area network, or a local system accessible to a single domain. In one implementation, ad search system 50 includes one or more physical servers 52 and an ad data store 54. In one implementation, ad data store 54 stores sponsored content information containing ad creative content, or uniform resource locators or identifiers to content or other resources hosted by one or more advertiser systems 65. In one implementation, the content is stored in association with a keyword index. Still further, the keyword index may include bid amounts or other suitable weighting values that may bias ad selection. In one implementation, ad search system 50 may select one or more matching ads in ad data store 54 based on one or more keywords.

In one implementation, ad search system 50 allows users to upload ad creative content, including display or banner ads and other multimedia, apply one or more policies or business rules directed to ad selection, specify one or more attributes of target end users, and receive reports of ad usage, such as impressions, clicks and other interaction metrics.

A.1.e. Advertiser System

Advertiser system 65 is a network addressable system, such as a web site, corresponding to an advertiser or a hosting system that hosts ad or other content on behalf of one or more advertisers. In one implementation, advertiser system may comprise one or more physical servers 66 and a data store 67 storing data related to operation of advertiser system 65. For didactic purposes, advertiser system 65 may be run by a business enterprise to provide information concerning its products and services.

In addition, when accessed by a client application after activation of an ad link (for example), advertiser system 65 may provide a wide variety of information. For example, advertiser system 65 may provide a home page or other page near the top of a hierarchy of hypertext documents. In other implementations, advertiser system 65 may return ad creative content, such as a video, audio or still image. In yet other implementations, advertiser system 65 may present an order form directed to ordering a product or service. Advertiser system 65 may also provide coupons, such as discount coupons, that a user may print out and use.

A.1.f Client Nodes

Client node is a computer or computing device including functionality for communicating over a computer network. A client node can be a desktop computer 82, laptop computer, as well as mobile devices 84, such as cellular telephones, personal digital assistants. A client node may execute one or more client applications, such as a web browser, to access and view content over a computer network. In particular implementations, the client applications allow users to enter addresses of specific network resources to be retrieved. These addresses can be Uniform Resource Locators, or URLs. In addition, once a page or other resource has been retrieved, the client applications may provide access to other pages or records when the user "clicks" on hyperlinks to other resources. In some implementations, such hyperlinks are located within the web pages 30 and provide an automated way for the user to enter the URL of another page and to retrieve that page. The pages or resources can be data records including as content plain textual information, or more complex digitally encoded multimedia content, such as software programs or other code objects, graphics, images, audio signals, videos, and so forth.

A.2. Example Protocol Environment

The networked systems described herein can communicate over the network 60 using any suitable communications protocols. For example, client nodes 82, as well as various servers of the systems described herein, may include Transport Control Protocol/Internet Protocol TCP/IP networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TELNET, and a number of other protocols, may be used. In addition, a server in one interaction context may be a client in another interaction context. Still further, in particular implementations, the information transmitted between hosts may be formatted as HyperText Markup Language (HTML) documents. Other structured document languages or formats can be used, such as XML, and the like.

In some client-server protocols, such as the use of HTML over HTTP, a server generally transmits a response to a request from a client. The response may comprise one or more data objects. For example, the response may comprise a first data object, followed by subsequently transmitted data objects. In one implementation, for example, a client request may cause a server to respond with a first data object, such as an HTML page, which itself refers to other data objects. A client application, such as a browser, will request these additional data objects as it parses or otherwise processes the first data object.

Mobile client nodes 84 may use other communications protocols and data formats. For example, mobile client nodes 84, in some implementations, may include Wireless Application Protocol (WAP) functionality and a WAP browser. The use of other wireless or mobile device protocol suites are also possible, such as NTT DoCoMo's i-mode wireless network service protocol suites. In addition, the network environment may also include protocol translation gateways, proxies or other systems to allow mobile client nodes 84, for example, to access other network protocol environments. For example, a user may use a mobile client node 84 to capture an image and upload the image over the carrier network to a content site connected to the Internet.

Still further, in some implementations described below, the use of redirection messages is described. In particular implementations, redirection generally refers to transmitting a message from a server to a client application, for example, that causes the client application to access another server or resource without intervention or action by the end-user. Redirection can be accomplished in a number of different ways. For example, in connection with HTTP, redirection messages can be implemented using refresh meta tags, such as

```
<html><head>
  <meta http-equiv="refresh" content="0; url=http://www.yahoo.com/">.
```

In addition, redirection messages can be implemented using HTTP refresh headers.
HTTP/1.1 200 ok
Refresh: 0; url=http://www.yahoo.com/
Content-type: text/html
Content-length: 78
Follow <a href="http://www.yahoo.com/">link</a>.
Redirection can also be accomplished by transmitting an HTML page including JavaScript code operative to accomplish redirection. Other suitable redirection methods can be used for other protocol environments.

A.2. Example Computing System Architectures

The client and server host systems described herein can be implemented in a wide array of computing systems and architectures. The following describes example computing architectures for didactic, rather than limiting, purposes.

A.2.a. Example Server System Architecture

FIG. 17 illustrates an example computing system architecture, which may be used to implement a physical server. In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218, and I/O ports 220 couple to bus 208. Hardware system 200 may optionally include a keyboard and pointing device, and a display device (not shown) coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the location server 22, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist, with the components of hardware system 200 being coupled to the single bus. Furthermore, hardware system 200 may include additional components, such as additional processors, storage devices, or memories.

As discussed below, in one implementation, the operations of one or more of the physical servers described herein are implemented as a series of software routines run by hardware system 200. These software routines comprise a plurality or series of instructions to be executed by a processor in a hardware system, such as processor 202. Initially, the series of instructions may be stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like. Of course, other implementations are possible. For example, the server functionalities described herein may be implemented by a plurality of server blades communicating over a backplane.

A.2.b. Example Client System Architectures

FIG. 18 illustrates an example hardware system 401, which may be used to implement a client node. In one embodiment, hardware system 401 includes a processor 403 and a cache memory 404 coupled to each other as shown. Additionally, hardware system 401 includes a high performance input/output (I/O) bus 406 and a standard I/O bus 408. A host bridge 410 couples processor 403 to high performance I/O bus 406, whereas an I/O bus bridge 412 couples the two buses 406 and 408 to each other. Hardware system 401 also includes a wireless network interface 424, a system memory 414, and a video memory 416 couple to bus 406. In turn, a display device 418 couples to video memory 416. A mass storage 420, a keyboard and pointing device 422, and I/O ports 426 couple to bus 408. Collectively, these elements are intended to represent a broad category of computer hardware systems, including but not limited to general purpose computer systems based on the Pentium® processor manufactured by Intel Corporation of Santa Clara, Calif., as well as any other suitable processor.

The remaining elements of hardware system 401 are described below. In particular, network interface 424 provides communication between hardware system 401 and any of a wide range of wireline (e.g., Ethernet, etc.) or wireless networks, such as a WLAN (i.e., IEEE 802.11), WiMax (i.e., IEEE 802.16), Cellular (e.g., GSMA), etc. Mass storage 420 provides permanent storage for the data and programming instructions to perform the above described functions implemented in the system controller, whereas system memory 414 (e.g., DRAM) is used to provide temporary storage for the data and programming instructions when executed by processor 403. I/O ports 426 are one or more serial and/or parallel communication ports that provide communication between additional peripheral devices, which may couple to hardware system 401.

Hardware system 401 may include a variety of system architectures; and various components of hardware system 401 may be rearranged. For example, cache 404 may be on-chip with processor 403. Alternatively, cache 404 and processor 402 may be packed together as a "processor module," with processor 403 being referred to as the "processor core." Furthermore, certain embodiments of the present invention may not require nor include all of the above components. For example, the peripheral devices shown coupled to standard I/O bus 408 may couple to high performance I/O bus 406. In addition, in some embodiments only a single bus may exist, with the components of hardware system 401 being coupled to the single bus. Furthermore, hardware system 401 may include additional components, such as additional processors, storage devices, or memories.

In one embodiment, the operations of client-side functionality are implemented as a series of software routines run by hardware system 401. These software routines may comprise a plurality or series of instructions to be executed by a processor in a hardware system, such as processor 403. Initially, the series of instructions may be stored on a storage device, such as mass storage 420. However, the series of instructions can be stored on any suitable storage medium, such as a diskette, CD-ROM, ROM, etc. Furthermore, the series of instructions need not be stored locally, and could be received from a remote storage device, such as a server on a network, via network/communication interface 424. The instructions are copied from the storage device, such as mass storage 420, into memory 414 and then accessed and executed by processor 403. In some implementations, one or more aspects of the instructions may be implemented in hardware or firmware.

While FIG. 18 illustrates, for didactic purposes, the hardware architecture of a client according to one embodiment of the present invention, the client may, however, be implemented on a wide variety of computer system architectures, such as special purpose, hand held or portable devices, Personal Digital Assistants (e.g., converged devices which support WLAN data+voice), Laptop computers, hand-held phones, and the like. Still further, embodiments of the invention can operate in connection with other wireline hosts system, such as a desktop-based IP phone, and a laptop or desktop computer with an Ethernet Network Interface Controller (NIC).

An operating system manages and controls the operation of hardware system 400, including the input and output of data to and from software applications (not shown). The operating system provides an interface, such as a graphical user interface (GUI), between the user and the software applications being executed on the system. According to one embodiment of the present invention, the operating system is the Windows® 95/98/NT/XP operating system and/or Windows® CE (WinCE) operating system, available from Microsoft Corporation of Redmond, Wash. However, the present invention may be used with other operating systems, such as the Apple Macintosh Operating System, available from Apple Computer Inc. of Cupertino, Calif., UNIX operating systems, LINUX operating systems, Symbian operating systems, and the like.

A.3. Example Participant Roles

Particular embodiments of the present invention can involve multiple entities, each assuming one or more roles. For example, in one implementation, the benefit attachment mechanisms described herein may operate in connection with content owners, content uploaders, content embedding entities, network application hosting entities, and content consumers or end-users. In particular implementations, a given entity may assume more than one of these roles concurrently. An entity may be any suitable entity, such as an individual, a corporation, a partnership, a joint venture, and combinations of the foregoing. As described in more detail below, particular implementations operate to provide a benefit to one or more of the entities described herein based on dissemination of uploaded content over the network environment. In particular implementations, the benefit provided to one or more entities may be a monetary benefit, such as a share of revenues resulting from activation of a link in content-embedding code. The benefit may also be points in an account that may be redeemed for awards, such as travel and merchandize. In some implementations, the benefits provided to one or more entities may differ. For example, for a given link activation, one entity may receive a monetary benefit, while another may receive redeemable points or credits.

A content owner is an entity, such as an author or other content creator, that owns or purports to own the legal and/or beneficial rights to a given item of content. A content owner may have acquired rights in a given content item through creation of the content, or a purchase or other acquisition. Such rights may include copyrights and/or contractual rights. In some implementations, a content owner may be compensated as a result of use of a given content item by a content embedding entity. A content uploader is an entity that uploads a given item of content to a remote system, such as content site 20. As to a given content item, content owner may be the same entity as a content uploader, or a different entity.

A content embedding entity is an entity that uses a content item, such as by embedding the content in other underlying digital content accessible over a network, such as a blog or on-line forum post, a web page, or other network accessible content. In some implementations, a content embedding entity may be compensated as a result of third party activity related to the content that has been embedded.

A network application hosting entity is an entity that operates or hosts a network application, such as a web site, blogging site, a social networking site (e.g., MySpace.com, Yahoo 360, and the like), or a web page hosting service. In some implementations, a single entity may be a content embedding entity and a network application hosting entity. For example, a news media site or other publisher may embed a given content item in one or more pages of its own site, where the servers and other resources are administered within its domain. In some instances, end-users of a network application hosting entity may be content embedding entities. For example, an end-user of a social networking site, such as MySpace or Facebook, may embed content into her personal page. A network application hosting entity may also be compensated as a result of third party activity related to the embedded content.

A content consumer or end-user, in some implementations, is an entity that accesses network application hosting system 40 using a client node. One or more activities of content consumers, such as viewing embedded content and activating one or more links associated with the content, may result in compensation to one or more entities based on their respective roles relative to a given content item. Compensation, in some implementations, refers to a benefit, such as money, items, services, credits or points (redeemable for money, items, services, and the like) or any other benefit provided by one entity to another. In some particular implementations, one or more entities may share in revenues realized as a result of clickstream and/or purchase activity of a content consumer.

A.4. Participant Identification and Authentication

In some particular implementations, content aggregation and benefit attachment system 20 (or benefit attachment system 30) maintain user accounts for one or more of the entities discussed above. For example, content aggregation benefit attachment system 20 may maintain user accounts for content owners or uploaders. For example, content aggregation and benefit attachment system 20 may maintain user accounts, storing user account information in data store 28. In some implementations, a user provides login or authentication information to gain access to his or her account information. User account information, in addition to a user name and password, may also include address and other personally identifying information and possibly financial account information (such as bank account and routing information which can be debited or credited). User account information may also include other information such as user preferences, and tags describing one or more aspects of the user.

A variety of authentication mechanisms can be used; as discussed above, a user name and password authentication mechanism is one suitable authentication scheme. To protect the initial login information, content aggregation and benefit attachment system 20, for example, may employ Secure Sockets Layer (SSL) or other encryption mechanisms (such as HTTP-S).

In some implementations, discussed herein, users may access content aggregation and benefit attachment system 20 (or benefit attachment system 30) using a browser, or other client application. After a successful login, content aggregation and benefit attachment system 20, for example, may create a browser cookie with a corresponding user identifier or information that maps to the user identifier. Since the cookie is included in subsequent requests from the client application, content aggregation and benefit attachment system 20 can automatically identify the user as he or she navigates the system, requesting content or uploading content.

In some implementations, content owners or uploaders may have an account. In addition, content embedding entities may also have an account on content aggregation and benefit attachment system 20. Indeed, a single user may be a content owner relative to a first content object, and a content embedding entity relative to a second content object. In some implementations, users may register or apply for one or more roles in content aggregation and benefit attachment system 20. In other implementations, roles need not be explicitly defined in the user accounts.

B. Uploading Content

In a particular implementation, a user (content uploader) may access content aggregation and benefit attachment system 20 or content site 20a over computer network 60 with a client node to upload content. In one implementation, a special-purpose client application may be used to select content and upload selected content to content site 20. In another implementation, client computer 82 includes a browser or other client application that parses and displays Hyper-Text Markup Language (HTML) pages transmitted from content aggregation and benefit attachment system 20 or content site 20a. In one implementation, content aggregation and benefit attachment system 20 may transmit a page-based interface including functionality allowing a user to select content and upload it to content data store 24. Using the page-based interface, a content uploader may identify a data file embodying the content, and cause the data file to be uploaded to content data store 24.

FIG. 2 is an example user interface 100 facilitating the uploading of content to content data store 24 of content site 20. As discussed above, a user may access content aggregation and benefit attachment system 20 and upload content stored on a client node, or a system remote from the client node, to content data store 24. To upload content, a user may identify a data location corresponding to the content, and specify metadata relating to the content. Certain aspects of user interface 100, according to particular embodiments of the invention, may include a tags field 104 into which a user may enter metadata, such as one or more tags or words that describe or relate to attributes of the content 106.

As FIG. 2 indicates, a user may have a user identifier 102 and corresponding user account on content aggregation and benefit attachment system 20 or content site 20a. Content 106 stored in the data store 24, in one implementation, is stored in association with the user identifier 102 and the one or more tags entered in the tags field 104. In other implementations, the upload interface 100 can be extended with additional fields for entering user information, such as a user identifier (e.g., an account identifier, an email address, etc.), a URL that can be used in an attribution link, or other contact information.

Figure 3:
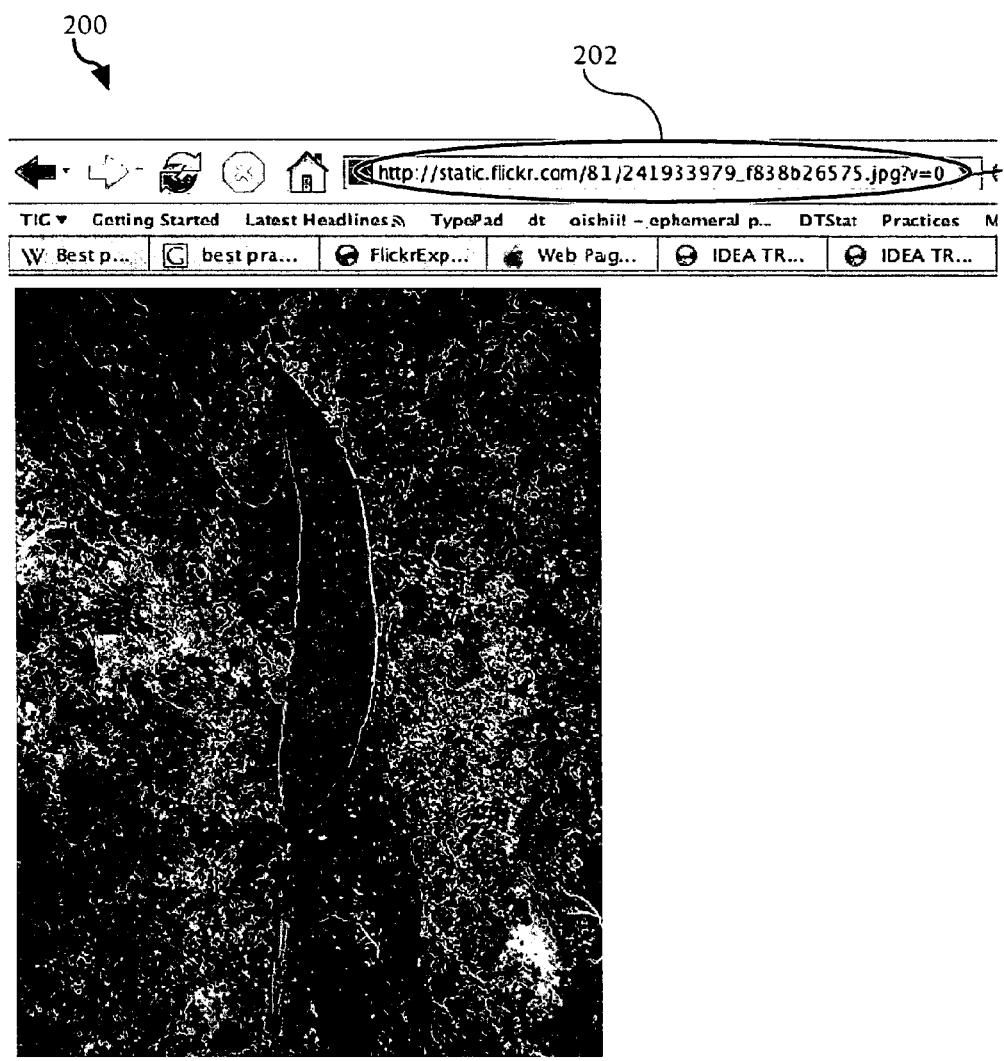
FIG. 3 illustrates an example web page and uniform resource locator corresponding to uploaded digital media content.

As FIG. 3 suggests, content 106 may also be stored in connection with a unique data location identifier, such as a uniform resource locator, that remote systems can use to retrieve content 106 from content aggregation and benefit attachment system 20 or content site 20a. As FIG. 3 illustrates, content 106 can be associated with a uniform resource locator (URL) 202 identifying a specific data location. In other implementations, a uniform resource indicator (URI), identifying the content but not the specific location, can also be employed. A URI would resolve in a database system to a URL.

The tags associated with the content can vary considerably. The tags can relate to the subject of the content (subject, location, etc.), the circumstances involving creation of the content (date, author, time, image capture settings, etc.), and the like. Other data can be associated with the content. For example, the tags need not be entered by the user who uploaded the content. Rather, the tags or other information may be entered by other users after accessing and viewing the content 106. In addition, one or more tags can be automatically extracted based on analysis of the content. For example, the digital file including the underlying content, such as an image or video, may also include one or more tags in reserved data fields. Other information can include the data and time when the content was uploaded. In addition, if the content includes text, content aggregation and benefit attachment system 20, for example, can execute a programmatic process to extract one or more tags from the content. Still further, content may also be tagged with one or more geographical locations or geo-tags.

In some particular implementations, the content uploader may specify one or more attributes of the content-embedding code. For example, the content uploader may specify a URL that to be included in an ad link section of the content embedding code. For example, a motion picture studio may upload still images from a movie to content aggregation and benefit attachment system 20, and specify a URL to be included in an ad link of the content-embedding code. The URL may correspond to the official movie home page where a user may pre-order tickets, or purchase merchandise. When such an ad link is clicked, an entity that embedded the content-content embedding code that caused the content and the ad link to be displayed on his or her blog page, web site or other network resource may receive a benefit, such as a monetary award.

Other implementations are also possible. For example, the content owner may elect to pay for dissemination of uploaded content. Content aggregation and benefit attachment system 20, in an upload interface, may include an interface control allowing the content owner to select this option. In some implementations, the revenue model employed can be a pay-per-impression or a pay-per-click scheme. In a pay-per-impression scheme, the content owner may pay one or more entities, such as a content embedding entity, each time the content object is accessed as a result of being embedded in an underlying network resource, such as a blog page, web site, and the like.

FIG. 22 sets forth an example method directed to uploading a content object. In the implementation shown, server 22 of content aggregation and benefit attachment system 20, for example, may receive an upload request (1252), resulting from activation of a command on upload interface 100 (see FIG. 2). The upload request may include a plurality of attributes extracted from the upload interface, such as tags. Certain attributes may include indications of selected options, such as whether the uploaded content is private or public, whether the content object is available for embedding, or whether the content owner has elected to pay for distribution ("paid distribution" option) of the content via the embedding mechanisms described herein. In one implementation, server 22 stores the content object in a content data store 24 in association with the attributes included in the upload request (1254). In one implementation, a content location or identifier is generated that can be used in subsequent retrievals of the content (1256). As FIG. 22 shows, if the content owner has elected to paid distribution option (1258), server 22 sets a flag or other identifier that is stored in association with the content object (1260).

C. Content Embedding and Content-Embedding Code

Figure 4:
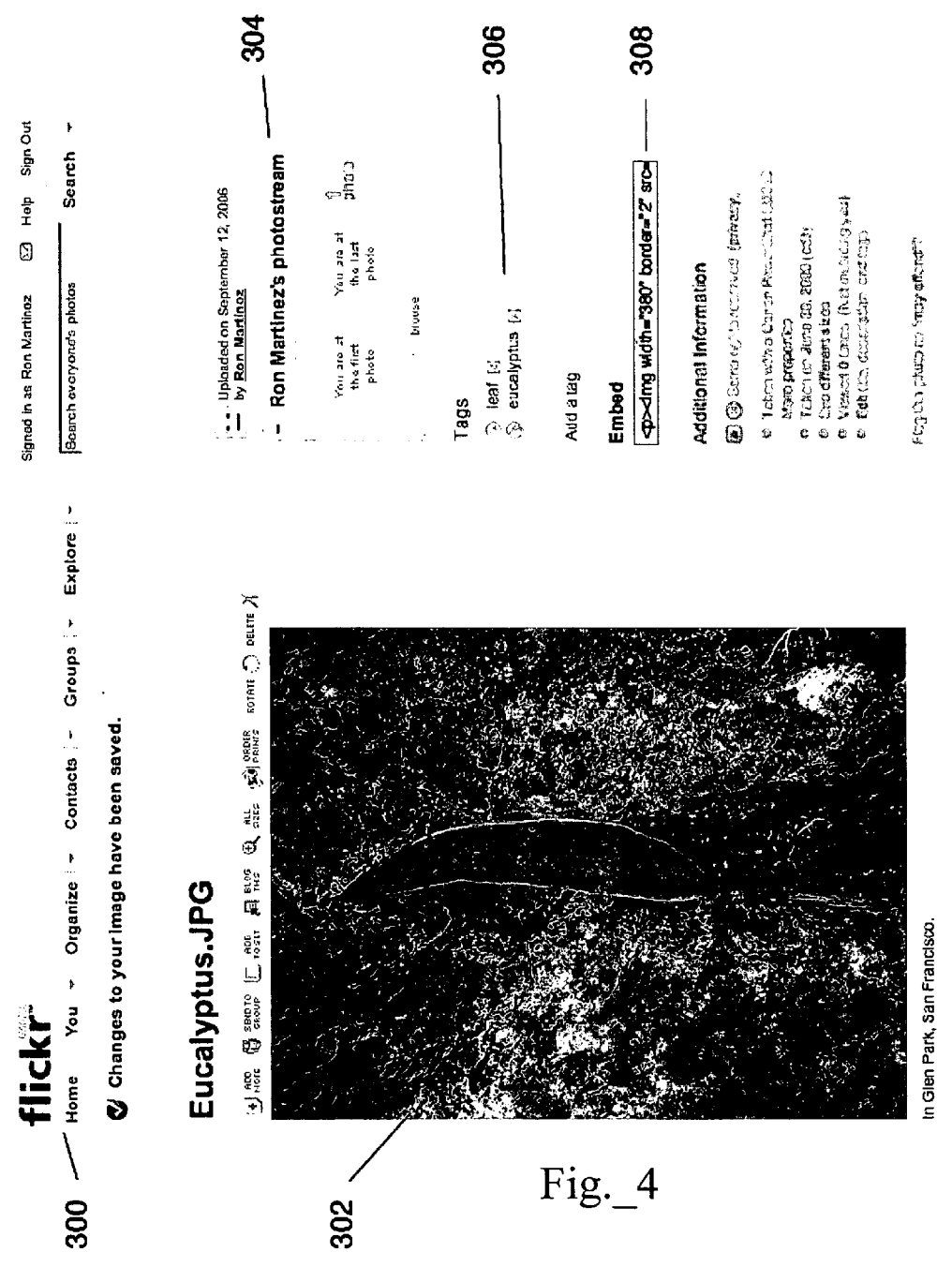

FIG. 4 shows a page-based interface 300 including content 302. As discussed above, the content 302, in one implementation, may be associated with the particular user (content owner) 304 who owns, purports to own, and/or uploaded the content. One or more tags 306, supplied by the content uploader or other users, are included in the interface 300. Interface 300, in the particular implementation shown, also includes an embed field 308. In one implementation, the embed field 308 includes content-embedding code, which can be used to embed and display the content 302 in other underlying content. For example, the content-embedding code may comprise HTML code that can be inserted into an HTML page corresponding to an information web page, a blog page, an on-line forum, or a personal page on a social network site.

In the particular implementation shown, the content-embedding code in the embed field 308 is source code, such as HTML code, presented as plain text (and therefore not parsed, rendered or otherwise processed by a browser or other client application). A content embedding entity may use the content-embedding code by manually copying the content-embedding code in the embed field 308 and inserting it into a desired content file or object. In one implementation, the content embedding entity may highlight the content embedding code in the embed field 308, use "copy" or "cut" commands to load the code into a temporary buffer, and "paste" the selected content-embedding code in one or more desired locations in an underlying data or content file. In another implementation, interface 300 may include an "embed" control, such as a hypertext link or command button, which activates a script that automatically loads the content-embedding code into the temporary buffer. In yet another implementation, the embed control may cause a temporary text box, or a pop-up window, containing the content-embedding code to appear. The user may then select the content embedding code and paste it into a desired location or file. In another implementation, the interface 300 may include a hyperlink to the content-embedding code that, when activated, causes a remote system to generate the content-embedding code on demand, and return it to the requesting node.

In some implementations, the content embedding code can be stored in a data file (such as a text file) for later use by the content embedding entity. For example, the content embedding entity may opt to store the content-embedding code in a text file on a client node for later use. In some implementations, the content embedding entity may opt to store the content embedding file in a user account on benefit attachment site. Still further, the content-embedding code may be saved in a file having a format accessible to a special-purpose client application that is directed to the insertion of content-embedding code. For example, the special-purpose application may be a browser plug-in or toolbar application, which upon activation, retrieves available content-embedding code and allows a user to select content-embedding code for insertion, such as in a blog posting page, a personal page configuration interface, and the like.

Figure 5:
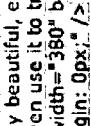
FIG. 5 illustrates an example blog posting interface.

FIG. 5 shows an example interface 400 facilitating the configuration of a blog post including content-embedding code inserted therein. When configuring the blog post, a content embedding entity may paste the HTML code 402 copied from the embed field 308 into the HTML code of the blog page. In the implementation shown in FIG. 5, interface 400 includes an "edit HTML" tab that allows a user to directly edit the HTML code of the blog post. When parsed by a browser or other client application, for instance, the content-embedding code 402 causes the browser to retrieve the content and display it in connection with one or more links. The content-embedding code may be incorporated into a variety of systems, such as information systems, and social networking systems. Indeed, a blog post represents one of many possible forms of social media in connection with which the content-embedding code can be used. For example, the content-embedding code may be incorporated into personal pages on social networking sites, such as MySpace.com, Facebook, Yahoo! 360, and the like. The content-embedding code may also be used by a content-embedding entity in other contexts. For example, the content-embedding code may be entered into a thread on a public forum site. For example, a content-embedding entity may find an image of an automobile on content site 20. The content-embedding entity may then incorporate the image by pasting the content-embedding code 402 into a post on a public automobile forum. Still further, a webmaster or other user may include the content-embedding code into one or more pages of a web site, such as a commercial news site (e.g., cnn.com, zdnet.com, etc.).

Figure 7:
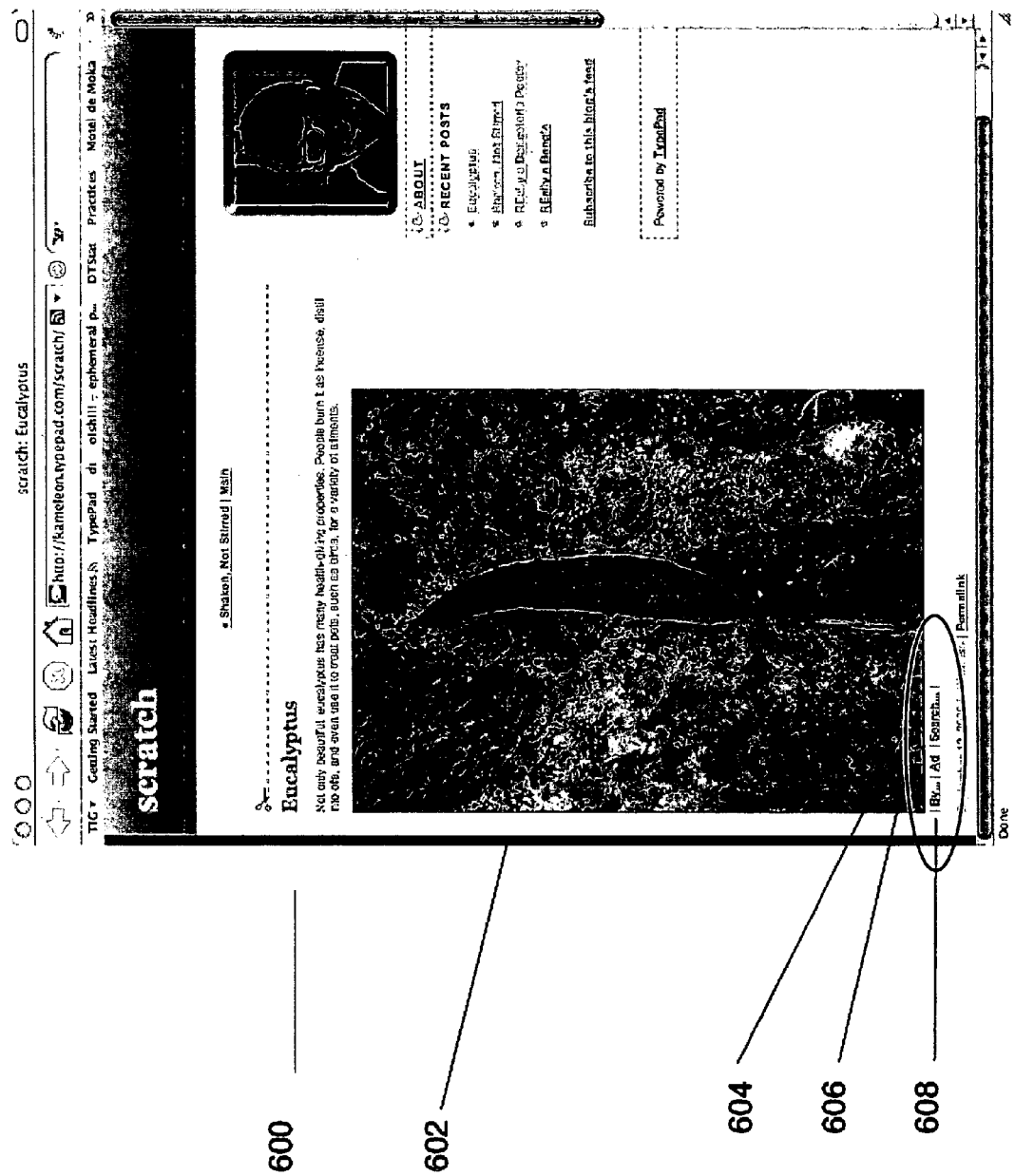
FIG. 7 illustrates an example user interface including embedded content and benefit attachment links.

FIG. 7 illustrates an example blog page 600 including embedded content. In posting the illustrated blog, the content-embedding entity (here, a blog poster) has entered written text and the content-embedding code that causes selected content to be displayed (see FIG. 5). As FIG. 7 illustrates, the blog page 600 includes attribution, advertisement and search locators as hypertext links 604, 606, and 608, respectively. Note that other links and information can be displayed along with the content. For example, the same mechanism can be used to display a "Share" link that pops up a window inviting the viewer to supply one or more email addresses. Completion of the work flows of the share link may cause an HTML-based message, including the content embedding code, to be transmitted to the recipients. The recipients, upon accessing the message, would be presented with the content and the one or more links contained in the content-embedding code. Another link might be an "IM" link invoking an instant messenger session with the content owner, and so on. Furthermore, the content-embedding code may be configured to embed the content as an activatable region, such as an HTML image map encoded with a selected link (such as an advertising or search link). If a user clicks within this region, the link associated with the region is activated, causing the client application to transmit a request to the server identified in the link.

B.1. Content-Embedding Code

Content-embedding code may take many forms. For example, content-embedding code may be source code, such as HTML code, or object code. Content-embedding code may also include one or more scripts, such as JavaScript, expressing functions that are embedded in or included from HTML code. These script functions can interact with the Document Object Model (DOM) of the page to perform one or more tasks. Scripts may also be used to make calls to remote servers after an HTML page has loaded. These calls can obtain new information or data, which additional script code can merge with the DOM of the existing page so that it is displayed or otherwise rendered.

FIG. 6A illustrates the elements of an example content-embedding code according to one particular implementation of the invention. In the implementation shown, the content-embedding code includes content code section 500, an attribution code section 502, an advertisement code section 504, and a search code section 506. Content code section 500 includes a content locator 510, such as a URL corresponding to the content to be embedded. The content locator 510 may include a URL of the system that hosts the content, such as content aggregation and benefit attachment system 20 or content site 20a. In other implementations, as FIG. 6B illustrates, the content locator 510 may include a URL 570 corresponding to benefit attachment system 30 (see FIG. 1B). In this implementation, the URL may include parameter information, such as a URL 572 or an identifier that maps to a URL, identifying the system hosting the content, such as content site 20a (see FIG. 1B). In this implementation, benefit attachment system 30 can track and/or control content usage (where the content is stored remotely from benefit attachment system 30), and redirect the client application to the system hosting the content. In the implementation illustrated in FIG. 1A, however, the content aggregation and benefit attachment system 20 hosts the content and need not employ redirection to track content usage. Content code section 500 may also comprise formatting or other information. For example, tags 512, 514, and 516 indicate the width, border and style to be used when displaying the content. One or more of the resource locators or indicators in the content embedding code may be formatted as hypertext links, which can be activated by a user click.

Attribution code section 502 includes an attribution URL 530 corresponding to information about the content owner. In one implementation, the attribution code section may include displayable text including attribution text or a credit byline. The attribution link may correspond to any network addressable resource, such as a web page, a personal page hosted by a social media site, an aggregation site, or other hosting system.

Advertisement code section 504 includes an advertisement locator 540, which when activated causes an advertisement to be displayed. The advertisement locator may take a variety of forms. For example, the advertisement locator may be a fixed or static URL that, when activated, causes a browser or other page-consuming client application to transmit a request to a network addressable resource, such as a web server, and receive an advertisement. In one implementation, the advertisement locator may be embodied in a hypertext link including the URL of benefit attachment system 30, and a static URL corresponding to an advertisement in a Common Gateway Interface (CGI) command. When the advertisement link is activated, the client application transmits a request to benefit attachment system 30, which transmits a redirection message to the browser.

In the particular implementation shown, the advertisement locator 540 comprises a URL of content aggregation and benefit attachment system 20 (www.flickr.ba.com) and includes as parameters the URL 541 corresponding to an ad providing resource, such as a web server of a sponsoring advertiser. The advertisement link may include one or more of the tags 542 and 544 associated with the content in the form of Pay-Per-Click tracking parameters allowing the sponsoring enterprise to log usage. In the implementation shown, when the advertisement link is activated, the client application transmits a request to benefit attachment system 30 (www.flickr.ba.com), which transmits a redirection message to the client application. The redirection message redirects the client application to the network resource identified in the "redrct" parameter field (See Ref. No. 541 of FIG. 6A). The use of redirection messages allows media attachment system 30 to track content and link usage. Other implementations are possible. For example, as FIG. 6C illustrates, the advertisement locator may include an ad identifier 571 that maps to a statically defined URL of an ad providing system.

As FIG. 6D illustrates, the advertisement code section 504 may also include one or more identifiers each corresponding to a different user or entity. For example, the advertisement code section 504 may include a user identifier 574 corresponding to the content embedding entity that embedded the content in an underlying resource, such as a blog page, web site, personal page, and the like. The advertisement code section 504 may also include an identifier 575 corresponding to the content owner that uploaded, owns, created, and/or controls the content. Further, as FIG. 6E illustrates, the advertisement code section 504 may also include an identifier 577 corresponding to the network application host system that hosts the resource into which the content has been embedded, such as a blogging site, social networking site (e.g., MySpace.com, Yahoo! 360, etc.), etc. As FIG. 6F illustrates, the advertisement code section 504 may also include an identifier 578 corresponding to the system that hosts the content, such as content system 20a. As discussed in more detail below, one or more of these identifiers may be used in the benefit attachment mechanisms described herein. Still further, as FIG. 6O illustrates, an identifier 579 corresponding to the content object can also be encoded in the advertisement code section 504 to allow content aggregation and benefit attachment system 20, for example, to track the content objects that generate clickstream activity.

In some implementations, the ad providing resource may be dynamically defined when the advertisement link is activated. For example, as FIG. 6G illustrates, the advertisement locator 570 may include a redirection parameter 576 including an identifier 569 of an ad search system and one or more key words 568. In the implementation shown, when the advertisement link is activated, the client application transmits a request to benefit attachment system 30 (www.flickr.ba.com), which transmits a redirection message to the client application. The redirection message redirects the client application to the network resource identified in the "redrct" parameter field—here, an ad search system (www.yahoo.ad.com)—, passing one or more keywords, and optionally a content embedding entity identifier and/or a content owner identifier. The ad search system can then use the keywords to select one or more ads to return to the client application. In some implementations, a browser cookie (including user identifying information) may also be passed with the request to the ad search system. The ad search system may use this information or related information to aid in ad selection. In some implementations, the ad search system may transmit a redirection message that causes the client application to access a remote advertiser system. In other implementations, the ad search system returns a selected ad directly. In alternative implementations, benefit attachment system 30 uses the content embedding entity identifier and/or a content owner identifier for usage and tracking purposes and does not provide them to the advertising search system.

As FIG. 6A shows, the search code section 506 may also include a search locator 550 operative, when activated, to provide search results related to the content. The search locator may comprise a URL of a search system 70 and one or more keywords 552, such as the respective values of one or more tags associated with the content. Activation of the search locator, such as clicking on a hypertext link, may results in a page of search results. The search results may include one or more links to sponsored content or paid search marketing ads in addition to, or in lieu of, algorithmic search results.

The search code section 506 may also include one or more of the entity identifiers discussed above (e.g., content owner, content embedding entity, content host, etc.) to be used in a benefit attachment mechanism. For example, as FIG. 6H illustrates, the search code section 506 may include an identifier 574 of the content embedding entity, who may share in the resulting revenue, if a third party who views the content clicks on the search link and, subsequently, a link to a sponsored search result. A share of revenue may also be provided to the content owner/provider. In one particular implementation, an identifier 575 for the content owner may also be included (see FIG. 6I). In another implementation, search code section 506 may include an identifier 577 corresponding to the network application host system that hosts the resource into which the content has been embedded (see FIG. 6J). A search system can use these entity identifiers to code one more links returned in the search results.

Other implementations are also possible. As FIG. 6I illustrates, for example, the search code section 506 may include a URL that identifies benefit attachment system 30 (Ref. No. 570), and includes identifiers 574, 575 of the content embedding entity and the content owner, respectively. As discussed below, activation of such a link would transmit a message to benefit attachment system 30, which could log the content embedding entity and content owner identifiers 574, 575 (for example), and then redirect (see Ref. No. 576) the client node to search system 70. In one implementation, the redirection message could also include the identifiers 574, 575 to allow the search system 70 to code one or more links to search results (such as one or more sponsored links) with the identifiers. If a user clicks on one of the coded links, the identifiers 574, 575 can be used to compensate the entities associated with the identifiers. Still further, as discussed above, an identifier 579 corresponding to the content object can also be encoded in the search code section 504 to allow content aggregation and benefit attachment system 20, search system 70 or other system to track the content objects that generate clickstream activity.

In one implementation, the content, such as an image, can itself be clickable, where a user click resolves to an ad link, a search link or an attribution link, above. As FIG. 6M illustrates, the content code section 500 may include HTML code that renders the displayed image clickable, resolving, for example, to an advertiser system through redirection messages. The link associated with the content, however, can incorporate a variety of the link types and data elements described herein.

Additionally, one or more aspects of the content embedding code may be dynamically generated. For example, if the content embedding entity is logged into content aggregation and benefit attachment system 20 or benefit attachment system 30, the identifier of the content embedding entity can be dynamically added to one or more sections of the content embedding code. In addition, the content-embedding code may be dynamically generated during creation of the page (see FIG. 4) to add the current tags associated with the content. In some implementations, one or more of the tags may also be dynamically generated upon activation of one of the links. In one such implementation, the parameters associated with the search code section, ad link section, etc. could include a content identifier and the URL of content site 20*a* to access the content site 20*a*, which adds the current tags, and then in a redirect transmits the most current tags in a URL of a search or ad system to the client application.

Content embedding code may also include other link types, such as a "buy content" link. In one particular implementation, activation of a "buy content" link initiates a purchase work flow on a remote server, where, for example, a user could purchase a higher quality digital image of the image content displayed in connection with the link, or a framed copy of the image. As discussed above, a share link may include HTML code that causes a client node to generate an email configuration interface including the content-embedding code. The email can be configured as an HTML email, which when accessed by the recipients may present the content and one or more links in a manner similar to that depicted in FIG. 7. Still further, a "contact owner" link can include code that causes a client node to generate an email configuration interface designating the content owner as the recipient.

The advertisement locator may be a URL or URI containing one or more parameters 542, 544 used in an advertisement selection process when submitted to an advertiser system 65 or an ad search system 50. In particular embodiments, the advertisement selection process may, for example, look up the key words—or tags—associated with this content and find an advertisement that matches the key words or tags. The ad system may transmit the dynamically selected ad in response to a request, when the advertisement locator is activated. Note that the process of selecting the ad could use a variety of rules or mechanisms to determine which ad to show, such as a real-time auction mechanism, a stated, static highest bidder, a routing to a URL as set recently by the advertiser, and so on.

B.2. Content-Embedding Code Generation

Various aspects of the content-embedding code may be statically or dynamically defined. In addition, the content-embedding code can be generated by a variety of different systems or nodes.

For example, in one implementation, the attribution, advertisement and/or search links can be defined after the content is uploaded to content site 20. In one particular implementation, where content site 20 and media attachment system 30 are integrated (such as under one administrative domain), media attachment system 30 may generate the content embedding code after the content is uploaded or in response to a request for the content. FIG. 8 illustrates an example method directed to providing content-embedding code with content. The example method can be used, for instance, to generate the interface illustrated in FIG. 4, above. Furthermore, the example method can be executed by a server of content aggregation and benefit attachment system 20 or benefit attachment system 30, depending on the implementation. For didactic purposes, the method is described as being executed by a server of content aggregation and benefit attachment system 20.

As FIG. 8 illustrates, when server 22 receives a request for content (752), it retrieves the requested content from the data store 24 (754) and generates a response that includes the content (756). If the data stored in association with the content has been flagged as set for benefit attachment (758)—in other words that the content uploader or owner assents to embedding of the content—, then server 22 retrieves or generates content embedding code (760) (see also FIGS. 9A-C, below) and includes the content-embedding code in the response. Lastly, server 22 transmits the response to the requesting node (764).

FIGS. 9A-C illustrate an example method for generating content-embedding code according to one possible implementation of the invention. In some implementations, some aspects of the content-embedding code may be dynamically defined. In some implementations, for example, some portions of the content-embedding code can be defined when the content is uploaded, while other aspects of the content embedding code can be defined when the content embedding entity accesses the content. As FIG. 9A shows, server 22 can retrieve the tags, content locator and other metadata associated with the content (780), and use this data to generate one or more aspects of the content-embedding code. In some implementations, server 22 may retrieve the identifier of the user currently accessing content system 20 (781). In one implementation, the user may have an account on content aggregation and benefit attachment system 20. In one implementation, the user identifier may be contained in a browser cookie, and/or maintained as server-side state information. This identifier may be a content-embedding entity identifier 575 included in one or more of the advertising code or search code sections 504, 506 discussed above. Accordingly, since in some implementations this aspect of the content-embedding code is not known until after a content-embedding entity requests the content, it is dynamically defined during generation of the response to a request for content. Server 22 then generates the content code section 500 including a content locator to the content (782), an attribution code section 502 including a link to the content owner (784), an advertisement code section 504 (786), and a search code section 506 (788). In some implementations, one or more of the foregoing code sections can be omitted.

As FIG. 9B illustrates, to generate an advertisement code section 504, server 22 may retrieve the one or more tags associated with the content (790), and transmit a request to an ad search system 50 including the one or more tags (791). Server 22 may receive from the ad search system 70 a response including an ad locator including a URL to an advertisement (792). Server 22 generates an advertisement link, in one implementation, with the identifier of the content embedding entity and the ad locator (793). In the implementation shown, the ad locator may include PPC codes (see FIG. 6A). As FIG. 9C illustrates, to compose a search code section 506, server 22 may retrieve the one or more tags associated with the content (795) and generate a search link, in one implementation, with the identifier of the content embedding entity and a search locator including one or more search terms based on the tags (796). As discussed above, a variety of other implementations are possible. Still further, the tags may be processed to yield alternative or additional keywords used in ad selection or in subsequent search processes.

FIG. 9E illustrates another example method that may be used to generate the advertisement code section. As illustrated, server 22 may first determine whether an advertisement locator has already been specified for the content object (1120). As discussed above, a content owner, during upload or subsequently, can, in some implementations, specify an ad locator to be used in the content-embedding code. In one implementation, the ad locator is stored in association with information about the content object. If an ad locator has been specified, server 22 retrieves the ad locator associated with the content (1128) In another implementation, the content owner may specify a set of ad locators that can be selected in a round-robin process, or some other scheme. If an ad locator has not been specified, server 22 accesses the tag(s) associated with the content object (1122), and retrieves an ad locator from ad search system 50 using the tags (1124). Server 22 then generates the ad hyperlink (1126). The ad hyperlink may identify one or more entities, such as the content embedding entity and the content owner. In addition, as discussed herein, the ad hyperlink may be a redirection link that includes the ad locator as a plain text parameter in the URL of the hyperlink or as an encoded identifier that a remote system, corresponding to the host identified in the URL, maps to an ad locator and returns in a redirection message.

Other implementations are possible. When the content is remote from content aggregation and benefit attachment system 20 or benefit attachment system 30, the server 22 may accept the URL of the content, and access the content, in one implementation, to render it in a frame of the HTML page. Server 22 may also process the page to extract one or more tags. Optionally, server 22 may query the user for tags. Server 22 may then construct the content-embedding code in a similar manner to the foregoing.

Content-embedding code may also be generated in other contexts. For example, a content embedding entity can view or search for content to embed. The content embedding entity may select content, and then activate functionality that causes an embedding event record to be generated. The record may include a content identifier that maps to a record of the content, or a URL of the content, an identifier of the embedding entity, and one or more tags. The record has a unique identifier associated with it. The content embedding entity is provided with content embedding code that includes a URL including the unique identifier that corresponds to the embedding event. The embedding event URL when embedded in an HTML page or other resource is operative to access content aggregation and benefit attachment system 20, for example, which returns the content-embedding code, including the code sections identified above. In this implementation, content aggregation and benefit attachment system 20 or benefit attachment system 30, for example, can dynamically generate the content-embedding code in response to a request including an embedding event record identifier.

B.3. Script-Based Content-Embedding Code

In some implementations, one or more sections of the content-embedding code may contain a script, or calls to retrieve a script, that dynamically generates one or more aspects of the links provided when the embedded content is accessed. FIG. 6N illustrates an example content embedding code that is operative to invoke a script that forms the locators and links discussed herein. For example, the content embedding code includes the location of a server hosting the content, an identifier of the content, a content embedding entity identifier, a content owner identifier, one or more tags, and formatting parameters. The content embedding entity also includes a URL to a script. Generation of the content-embedding code that retrieves the script may be similar to the foregoing. Content aggregation and benefit attachment system 20, for example, may obtain the entity information and tags and construct content-embedding code similar in format to that shown in FIG. 6N.

In one implementation, shown, when the content-embedding code is inserted into an HTML document and subsequently accessed by a client application, the client application may retrieve and execute the script. The script may, using the parameter values in the content embedding code, may make calls to one or more remote servers to retrieve and render the content, as well as generate one or more of the links described herein. For example, the script, when executed, may cause the client application to query ad search system 50 for an ad URL, and then render the identified content as a clickable region that, when clicked, resolves to the ad URL.

FIG. 9D illustrates an example method that can be implemented by a script that dynamically generates content embedding code. As FIG. 9D illustrates, the script, when invoked, may access the content-embedding code parameters (1102), and retrieve the content object identified in these parameters (1104). Using the tags identified in the parameters, the script may retrieve ad locator information from an ad search system 50 or search system 70 (1106). The script may then create one or more of the links discussed herein (e.g., ad, search, or attribution links) (1108), and add the content object and links to the underlying HTML page (1110).

In other implementations, the script, when executed, may retrieve creative banner ad content from ad search system 50 and render it next to the content. Ad selection, in both instances, can be based on one or more of the tags in the content-embedding code. In yet another embodiment, the script, when executed may query search system 70 for one or more sponsored search links (see above) and render the returned search links adjacent to the content identified in the content-embedding code. In one implementation, the script may render the content as a clickable region that resolves to one of the sponsored search results, such as the highest ranking sponsored search result.

Still further, the script may encode the content embedding entity identifier, the content owner identifier or other entity identifier contained in the content embedding code into one or more of the URLs of the links. For example, the script may add the content embedding entity identifier to the ad link to allow this entity to be credited if an end-user clicks on the ad link. As discussed herein, in one implementation, the ad link may cause one or more redirection messages to be transmitted. In another implementation, the script may transmit the content embedding entity and content owner identifiers to the ad search system 50.

The script, when executed, may also make remote calls to content aggregation and benefit attachment system 20 or benefit attachment system 30. For example, the script may transmit a message including the content identifier to benefit attachment system 30, allowing it to maintain a usage counter in connection with the content object. In one implementation, this may enable the content owner, for example, to be compensated based on the number of times the content was accessed.

In addition, the script may access information beyond the content embedding code. For example, the script may access the DOM of the underlying HTML page to extract and process information. For example, the script may process the data of the underlying HTML page to extract one or more keywords or other data that may be useful, for example, to further refine ad selection. In addition, the script may add one or more of the extracted keywords to the ad search link. In other embodiment, the script could process the data of the HTML page, filtering out extraneous information such as "the", "a", "and", and the like, and transmit this information in as contextual information with the tags, when querying for a banner ad, sponsored content link, and the like. In addition, the script may access the DOM to identify the network application hosting site 40 (identified, in one possible implementation, by domain name) that hosts the underlying HTML page. The identity of network application hosting site 40 receive a benefit, such as a share of revenues, resulting from clickstream activity of end-users.

Another way to detect more information in an underlying content object is to read the meta tags in an automated way. The meta tags are well-structured and provide the information just like tags. For example, a meta tag may include <meta name="keywords" content="photography, digital photography, camera phones, camera>. For example, page-scraping mechanisms and semantic technologies can be used to understand the theme of the page. These meta keywords as provided by the user would be a valuable and direct relation to understand the theme of the image uploaded by the user. Using this information and the tags, a semantic engine may select one or more relevant topics from a dictionary, and may select one or more relevant sponsored links for these topics from search system 70, or creative ad content from ad search system 50. In addition, search system 70, or ad search system 50, may employ a categorization tool to understand the categories based on tags and meta tags. Categories can map to a set of keywords. For example, the keyword "photography" may map to a category, entitled "Arts & Photography." Relevant ads for this category could be selected by ad search system.

B.4. Content-Embedding Utility

In some particular implementations, a plug-in, bookmarklet, or other module may be employed to facilitate searches for content and insertion of content-embedding code into an underlying data object, such as a blog post. The plug-in, in one implementation, may be a browser toolbar application or plug-in. When activated from the toolbar, the plug-in module may present a user interface, such as a pop-up window, that accesses a remote content site, such as content aggregation and benefit attachment system 20 or content site 20a and presents a search interface. In another implementation, the pop-up window may be implemented by a bookmarklet, which is a script (e.g., JavaScript code) set as a bookmark to a URL corresponding to the script. When the bookmarklet is selected, the script may operate to create the pop-up window as shown in FIG. 19. The script may be stored at a remote system, or locally relative to a client. Activation of the pop-up window, in one implementation, results in an access to a remote system, such as search system 70, which returns a search interface page. The pop-up window, in one implementation, can be a browser window that operates in connection with a remote search system 70 and presents the user interface illustrated in FIG. 19.

FIG. 19 illustrates an example user interface that facilitates searching for content and insertion of content-embedding code. For example, for didactic purposes, a user may be using interface 400 to create a blog post. The user may decide that certain content may be desirable to include in the post. In one implementation, the user may activate the plug-in by, for example, clicking on a button in a browser toolbar, or a bookmarklet by selecting a corresponding bookmark. As a result, the plug-in or bookmarklet, for example, may initialize and present interface 1000 to the user, as shown in FIG. 19. Interface 1000, in the particular implementation shown, includes a search query dialogue box where the user may enter one or more keywords. The search results displayed to the user may include one or more results. Each result 1004, 1006, 1008 may include a thumbnail or other rendition of the content and corresponding content-embedding code 1010. As discussed above, the user may simply copy the content-embedding code 1010 of the desired content image into the blog post interface 400. Of course, the interface 1000 may support any of the insertion functions discussed above, such as a command button that automatically loads the content-embedding code into a buffer for a paste operation.

FIG. 20 provides an example method which may be implemented by the plug-in module. After the plug-in is initialized or activated, it may transmit a request to a remote system, such as a search system 70 that supports searches for content, such as images and video (1050). The search system 70 may return a response including a search query interface (see 1052), which the plug-in receives and renders in interface 1000. After a user enters a search query and submits it, the plug-in transmits the search query to search system 70 (1054) and receives a response including one or more search results (1056). The plug-in or the remote search system 70 may process the search results and generate content-embedding code for one or more of the search results, as shown. The plug-in then displays the results with the content-embedding code (1058). The user may close out the window at any time, or keep it off to the side for later use. In one implementation, the plug-in may ask the user for account information, such as a user identifier, which can be used as the content embedding entity identifier when constructing the content embedding code.

FIG. 21 illustrates an example method that can be implemented by search system 70. In the particular implementation shown, when search system 70 receives a search request for content from a remote host (1060), it executes a search for content across one or more remote systems accessible over network 60 generally, and/or to select content data stores, such as content site 20a or content aggregation and benefit attachment system 20 (1062). As to one or more of the search results, search system can generate content-embedding code as discussed herein (1064). For example, search system 70 can identify the current user based on a login, for example, and add the user identifier as a content embedding entity identifier to the content-embedding code for a given search result. Search system 70 may also receive a content owner identifier in connection with a given search result and add it to the content-embedding code. Still further, the search system 70 may add an identifier of the remote system that hosts the content as the network application hosting entity in the content embedding code. Search system 70 then transmits the search results and the content embedding code (or links to content-embedding code) to the remote host (1066). In another implementation, the content-embedding code links, when activated, cause search system 70 to generate the content-embedding code on demand.

Other implementations are possible. For example, the plug-in or bookmarklet may be configured to operate in connection with a single content site 20a or content aggregation and benefit attachment system 20, as opposed to a search system 70 that maintains an index of content accessible from a large array of hosts in the network environment. Furthermore, the plug-in or bookmarklet may be configured to access the DOM of the underlying web page to determine the network application hosting site 40. An identifier, such as a domain name, of the network application hosting site 40 can be added to the content-code, or passed to a remote system that maps the domain name to an identifier.

D. Link Activation and Benefit Attachment Process and Message Flows

Use of content embedding code and activation of the links in content-embedding code can initiate a variety of processes and message flows. In particular implementations, some of the processes and message flows are directed to recording retrieval events in a manner that allows one or more entities to share in the revenue generated by activation of the links.

For example, content aggregation and benefit attachment system 20 may track content usage and provide reports to one or more entities, such as the content owner and the content embedding entity. For example, as to content hosted by it, content aggregation and benefit attachment system 20 is naturally in a position to track content usage, since requests for the content are transmitted directly to it. In implementations discussed herein, content-embedding code may be configured to first direct messages to content aggregation and benefit attachment system 20 which redirects a client application to a remote content host. In this manner, content aggregation and benefit attachment system 20 may track usage of remotely hosted content.

Content aggregation and benefit attachment system 20 can track usage, which may be useful to generate reports, such as usage reports, revenue generation reports. For example, content aggregation and benefit attachment system 20 may generate a content embedding report that allows content owners to view which content embedding entities have used their content. In addition, the content owners may view reports indicating the revenue attributable to given content objects and/or content embedding entities. Other reports may allow content embedding entities to determine which content objects generate more revenue relative to other content objects.

FIG. 23 illustrates an example method that may be implemented in response to a request for a content object transmitted to content aggregation and benefit attachment system 20. In the implementation shown, when server 22 receives a request for a content object (1202), it may log the request as a content object retrieval event against one or more entities identified in the request or the entities (e.g., content owner) associated with the content object (1204). For example, as FIG. 6P illustrates, a content embedding entity identifier 574 may be added as a parameter to the content URL, which is passed to content aggregation and benefit attachment system 20 with the request for the content object. As discussed above, the content owner may have selected a paid distribution option. In the implementation shown, content aggregation and benefit attachment system 20 may access a database, such as data store 24, to determine whether the content owner has selected this option (1206). If so, content aggregation and benefit attachment system 20 records the retrieval event as a debit event against the account of the content owner (1208). In some implementations, content aggregation and benefit attachment system 20 may also record the retrieval event as a credit against the account of the content embedding entity.

D.1. Attribution Link

FIG. 10 shows an example page 700 that is returned as a result of clicking on an attribution link. The returned page can correspond to the content creator, content owner, or the content uploader (i.e., the individual or entity that caused the content to be uploaded). In the implementation shown, the page is automatically generated based on user account information maintained by content aggregation and benefit attachment system 20 or content site 20a. In other implementations, however, the attribution link can be configured to include a URL for any content desired by the content owner. In some implementations, the attribution link addresses a deficiency in the marketplace, where attribution requirements of various digital rights regimes are routinely ignored. As a result, content owners seeking to participate in a new cultural marketplace model do not receive even a minimal, baseline reward for their efforts. The attribution link and processes involved in its creation facilitate providing attribution to content owners and creators, who therefore may be more motivated to upload content for use by others.

D.2. Advertisement Link

FIG. 11 shows an example page that may be returned as a result of clicking on an advertisement link. The URL of the page ultimately displayed to the user can be determined in a variety of ways. Clicking on the link that invoked the URL may generate revenue from the advertiser. This revenue may be shared between one or more of the entities described herein. For example, the revenue generated from an ad link may be shared between content aggregation and benefit attachment system 20, the content embedding entity, the content owner, and the network application hosting entity. As discussed described herein, the message flows between the various systems can contain information, such as entity identifiers and content identifiers, to allow for determinations of the revenues or other benefits to be shared by various entities.

When a user "clicks" on the ad link with a computer input device, a request is transmitted to initiate retrieval of the information associated with the ad link. In some implementations, each access or "click" on the ad link will be redirected to content aggregation and benefit attachment system 20, or some other system, to associate the "click" with the account identifier for an advertiser. This redirect action, for example, may access account identification information coded into the ad link before accessing the advertiser's URL using the ad link clicked on by the user. The account identification information is recorded in the advertiser's account along with information from the retrieval request as a retrieval request event. Since the information obtained through this mechanism matches an account identifier with a URL, accurate account debit records can be maintained.

Figure 12A:
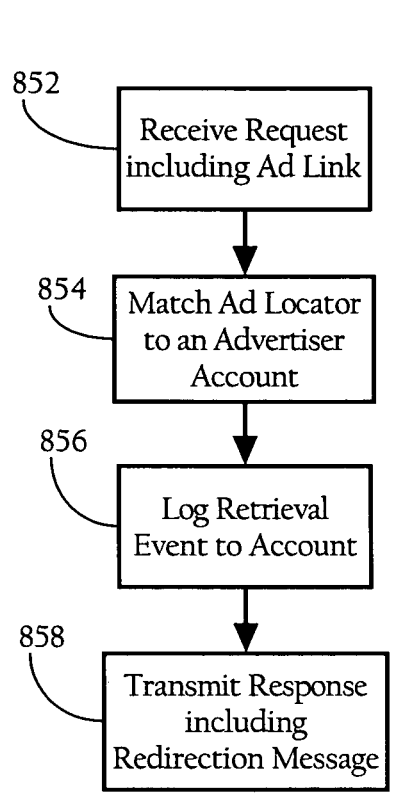

In the ad links illustrated in FIGS. 6A and 6C, content aggregation and benefit attachment system 20 or benefit attachment system 30 may process the ad links as illustrated in FIG. 12A. For example, benefit attachment system 30 may receive a request from a client application including an ad link (852). Benefit attachment system 30 matches one or more aspects of the ad link to an advertiser account (854), and logs a retrieval event to the identified account (856). Benefit attachment system 30 may use these logs to debit or charge the account as well. Benefit attachment system 32 then transmits a response including a redirection message to the client application. The redirection message includes a link to an ad, which in one implementation is displayed by the client application. In the ad link of FIG. 6C, content aggregation and benefit attachment system 20, for example, may access a data store to map the coded identifier to an ad locator.

Figure 12B:
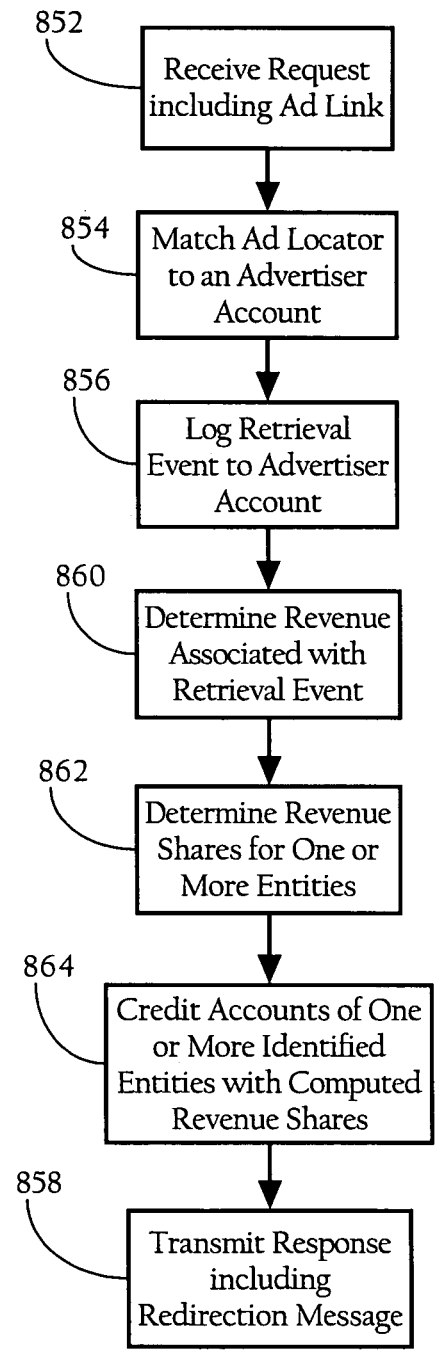

For the ad links illustrated in FIGS. 6D, 6E, and 6F, benefit attachment system 30 may use an expanded process flow, such as the method illustrated in FIG. 12B. As discussed above, when an ad link is activated, benefit attachment system 30 may receive a request from a client application including the ad link (852). Benefit attachment system 30 matches one or more aspects of the ad link to an advertiser account (854), and logs a retrieval event to the identified account (856). Benefit attachment system 30 determines the revenue (or other compensation) attributable to the retrieval event (860), and determines the share of the revenue provided to one or more of the entities identified in the ad link. As discussed above, revenue resulting from the user click may be shared between one or more of the content owner, the content embedding entity, the network application hosting entity, the content hosting entity, or the entity corresponding to the benefit attachment system 30. In implementations where more than one entity is entitled to revenues, benefit attachment system 30 determines the revenue shares of the one or more entities (862), and credits the respective accounts of the one more identified entities according to the computed revenue shares (864). Attachment benefit site 30 also transmits a response including a redirection message (858). Other implementations are possible. For example, benefit attachment system 30 can simply log the retrieval event and one or more entity identifiers for later batch processing.

FIG. 12C illustrates a method that content aggregation and benefit attachment system 20 or benefit attachment system 30 can use in connection with ad links where the matching ad link is dynamically selected (see also FIG. 6G). FIG. 13 is a block diagram illustrating an example message flow resulting from the execution of the method illustrated in FIG. 12C. In the particular implementation shown, when the ad link is activated, content aggregation and benefit attachment system 20 receives a request including an ad link from client node 86 (852) (FIG. 13, Ref. No. 1). Content aggregation and benefit attachment system 20 transmits a request for a matching ad to ad search system 50 using the one or more keywords in the request (872) (FIG. 13, Ref. No. 2), and receives a response including a link to a matching ad (874) (FIG. 13, Ref. No. 3). Content aggregation and benefit attachment system 20 composes a redirection message and transmits it to client node 86 (876) (FIG. 13, Ref. No. 4), causing the client node to transmit a request, and receive a response from, advertiser system 65 (FIG. 13, Ref. Nos. 5 & 6). Other implementations and message flows are possible. For example, content aggregation and benefit attachment system 20 and ad search system 50 can communicate indirectly through client node 86, using redirect messages.

Content aggregation and benefit attachment system 20 also logs the retrieval event to one or more entity accounts identified in the ad link transmitted by client node 86 (878), and determine the revenue associated with the retrieval event (880) and the revenue shares of one or more of the identified entities (882). In the particular implementation illustrated in FIG. 6G, for example, content aggregation and benefit attachment system 20 may credit the accounts of the content owner (coid) and the content embedding entity (ceeid) (884).

D.3. Search Link

Figure 14:
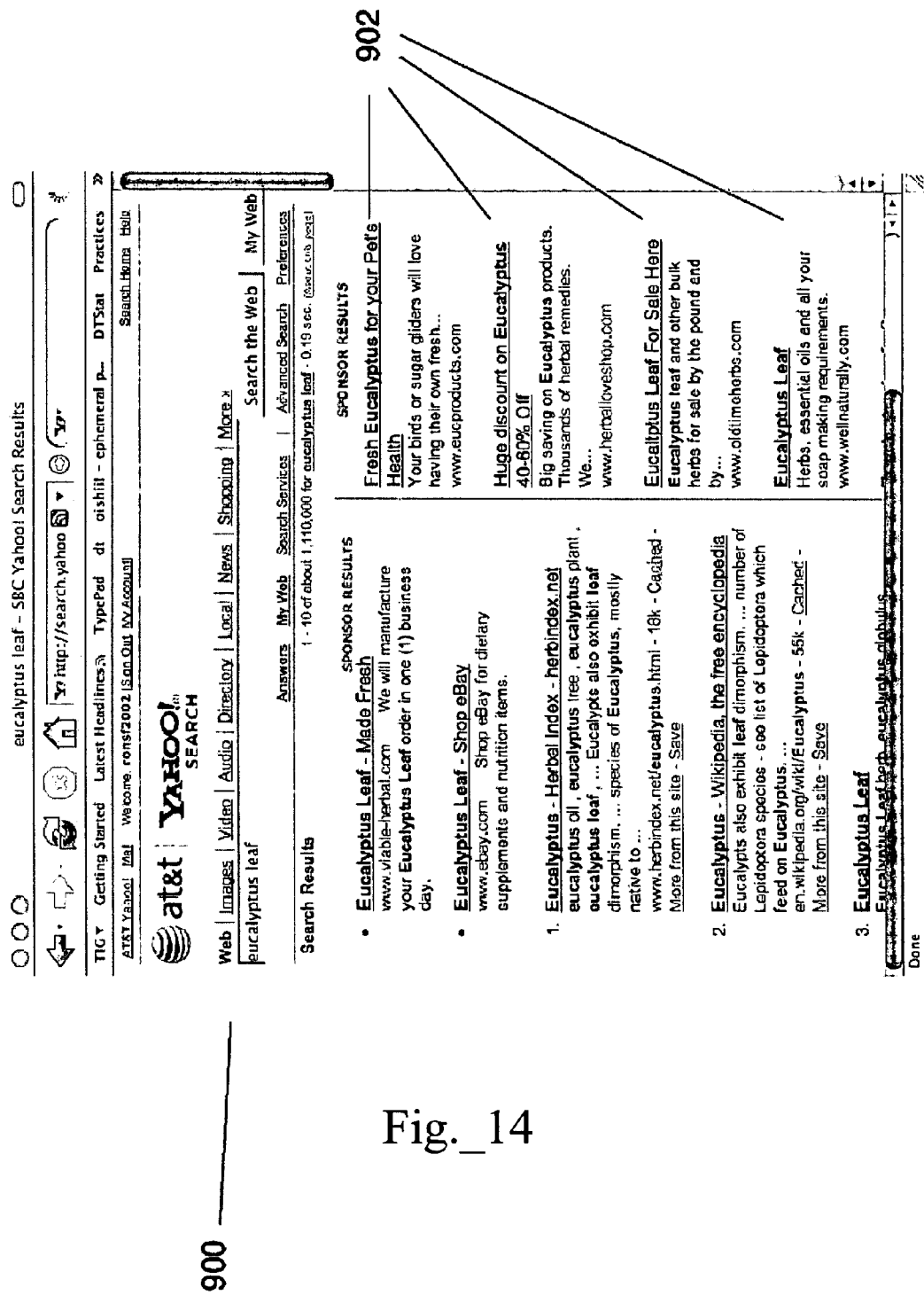
FIG. 14 is an example interface including search results.

FIG. 14 illustrates a page of search results that may result from clicking on a search link. In the particular implementation shown, the page includes a sponsored results section including sponsored links 902 to advertising, marketing or other promotional material. The sponsored links 902 generate fees when clicked pursuant to a pay-per-click (PPC) mechanism. These fees may be shared among one or more entities associated with the benefit attachment system 30. In other implementations, mere presentation of the sponsored search links themselves may result in revenue according to a pay-per-impression (PPI) revenue model.

Figure 15:
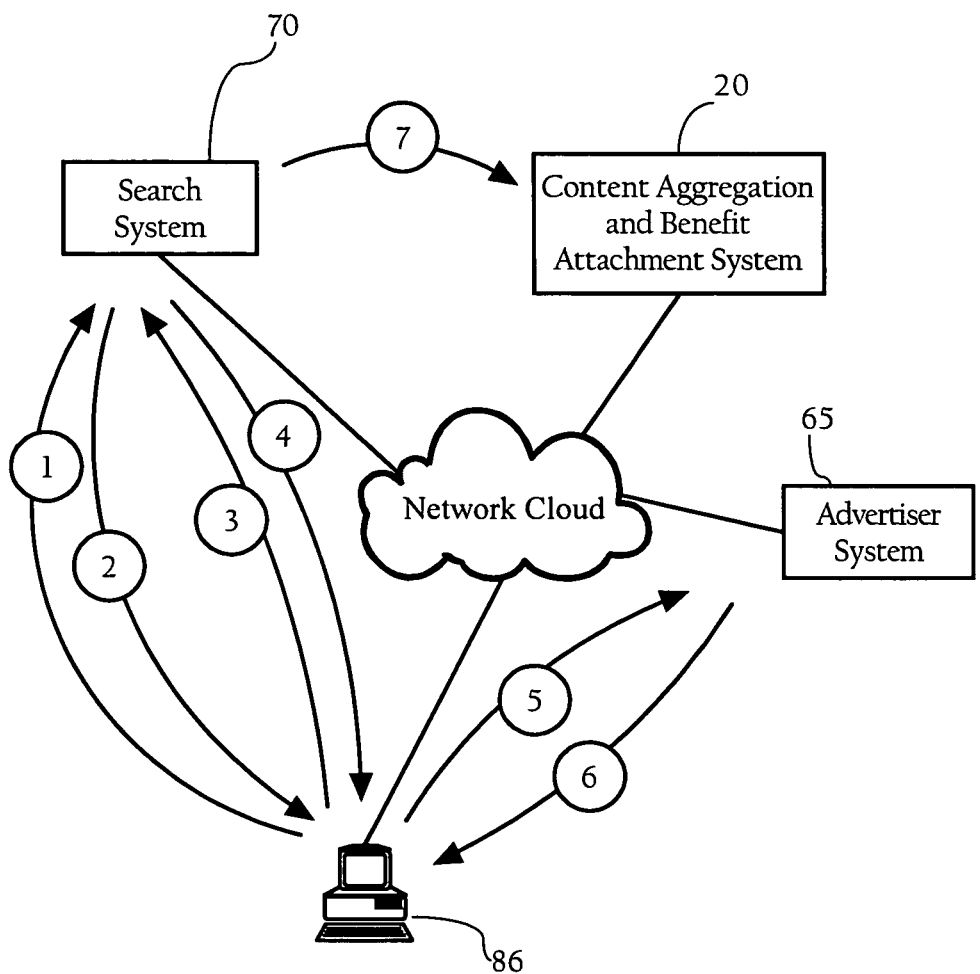
FIG. 15 is a schematic diagram an example message flow involving a search link according to a particular implementation.

FIG. 15 illustrates an example message flow, according to one particular implementation, that could result upon activation of a search link similar to those illustrated in FIGS. 6H-L. In the search links illustrated in these figures, link activation causes a client node to transmit a search request, identifying one or more entities, to search system 70. In one implementation, the search system 70 is operative to recognize and appropriately handle the entity identifiers appended to the search link. In one implementation, the search link includes an identifier of the benefit attachment system 30 to allow search system 70 to identify benefit attachment system 30, as well. This may be useful in circumstances where search system 70 operates in connection with multiple benefit attachment systems and tracks the revenue attributable to each such system.

Figure 16C:
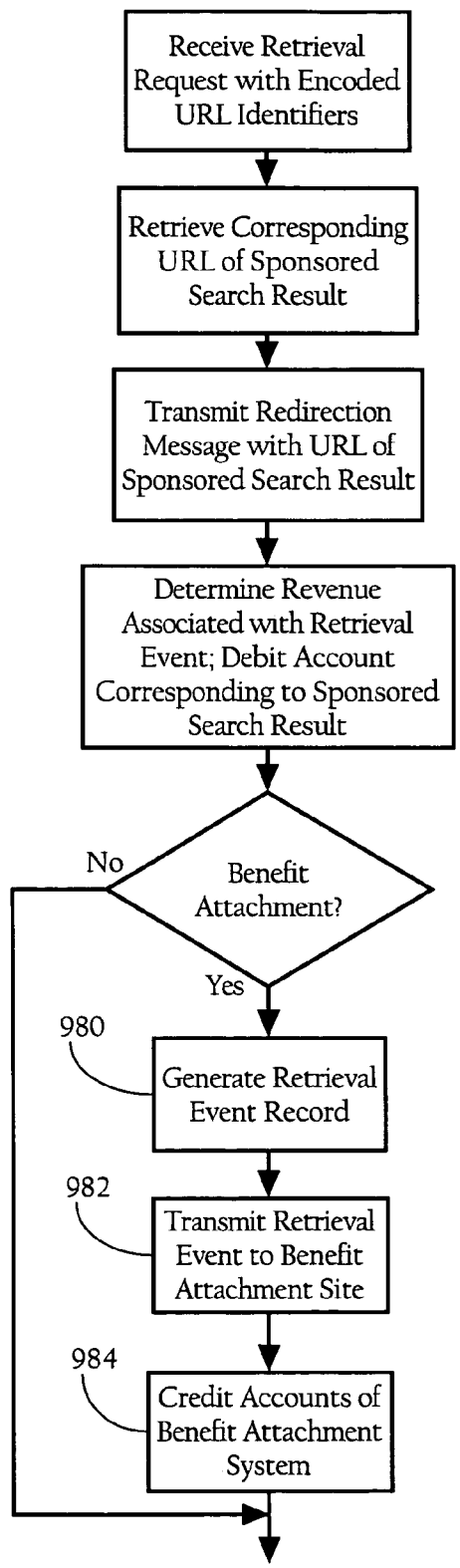

FIGS. 16A, 16B & 16C illustrate example methods that search system 70 may use in connection with particular implementations. As FIG. 16A illustrates, when search system 70 receives a search request (942) (see FIG. 15, Ref. No. 1), it generates search results including one or more links to respective network resources (946). In the particular implementation shown, at least a portion of the search results contains links to sponsored content (such as advertisement pages, advertiser home pages, and the like). In one implementation, search system 70, as discussed above, receives revenue from an advertiser or other enterprise associated with a link, if a user clicks on it. To allow search system 70 to track user clicks, the sponsored search links, in one implementation, include URLs that correspond to search system 70, but also include encoded information that maps to a URL of an advertiser. Accordingly, in the implementation shown, search system 70 generates encoded URL identifiers for one or more URLs of sponsored search results (946), and adds these encoded URL identifiers as a parameter to a redirection URL that identifies search system 70 (948). For example, the encoded URL identifier may be one or more strings and be included in the following example URL: http://search.yahoo-.com/_rdrct=UJASf4&SIG=11aygd. In one implementation, search system 70 stores the encoded URL identifier in association with the corresponding sponsored link for later use. After generating one or more encoded URLs for inclusion in the search results, search system 70 may transmit the results to the requesting client node (954) (see FIG. 15, Ref. No. 2).

As discussed above, the ad link may include one or more entity identifiers associated with a benefit attachment mechanism. For example, as FIGS. 6H-L illustrate, the ad link may be encoded with one or more entity identifiers that, when included in a message to search system 70, trigger one or more processes related to the benefit attachment mechanisms described herein. As FIG. 16A illustrates, if the ad link indicates a benefit attachment (950), search system 70, in one implementation, stores the one or more entities identified in the search request to the corresponding encoded URL identifiers returned in the search results (952). These associations could also extend to additional encoded URL identifiers if the user requests additional search results.

FIG. 16B illustrates an example method that may be executed when a user clicks on a sponsored link in a set of search results. In the particular implementation shown, when search system 70 receives a retrieval request including an encoded URL identifier (960) (see FIG. 15, Ref. No. 3), it retrieves the sponsored URL or link that maps to the encoded URL identifier (962), and transmits the sponsored link in a redirection message (964) (see FIG. 15, Ref. No. 4) causing the client node 86 to transmit a request, and receive a response from, advertiser system 65 (FIG. 15, Ref. Nos. 5 & 6). In one implementation, search system 70 may simply log the retrieval event with relevant data (such as entity identifiers) and process account-related matters in a separate process. In the implementation shown, search system 70 determines the revenue associated with the retrieval event and, in one implementation, debits or charges the account corresponding to the sponsored link that was returned to the user (966). If a benefit attachment is associated with the retrieval event (968), search system 70 may log the retrieval event to one or more entity accounts (970), determine revenue shares for one or more entities, and credit the accounts of one or more entities according to the revenue shares.

Other implementations are possible. For example, search system 70 may distribute revenues to, or credit an account of, content aggregation and benefit attachment system 20 or benefit attachment system 30, leaving it to such systems to distribute resulting revenues to one or more entities. As FIG. 16C illustrates, search system may generate a retrieval event record (980), transmit it to benefit attachment site 982 (see FIG. 15, Ref. No. 7), and credit the account of benefit attachment site 984. Search system 70 may also record the retrieval event and subsequently process it in connection with other events in a batch process. In either implementation, content aggregation and benefit attachment system 20 or benefit attachment system 30 may then determine revenue sharing in a similar manner to the processes described above.

The present invention has been explained with reference to specific embodiments. For example, while embodiments of the present invention have been described as operating in connection with HTML and HTTP, the present invention can be used in connection with any suitable protocol environment. Other embodiments will be evident to those of ordinary skill in the art. It is therefore not intended that the present invention be limited, except as indicated by the appended claims.

What is claimed is:

1. A method comprising
receiving at a server, from a remote host associated with a first user, a request message including a content embedding entity identifier and information indicating an advertisement locator of an advertiser network resource, wherein the content embedding entity identifier is associated with a second user that has embedded a content object in an underlying network accessible resource accessed and rendered by the remote host on a display, and wherein the request message is generated in response to activation of an interface element rendered in proximity to the content object;
recording, by the server, an event related to the request message in an account corresponding to the content embedding entity identifier; and
transmitting, by the server, a response to the remote host, wherein the response causes the remote host to receive an ad from the advertiser network resource; and
associating a benefit to the account based on the event.

2. The method of claim 1 wherein transmitting the response comprises transmitting a redirection message to the remote host, wherein the redirection message includes the advertisement locator indicated by the information.

3. The method of claim 1 wherein the information identifies the advertisement resource locator.

4. The method of claim 1 wherein the information includes a coded identifier that maps to the advertisement resource locator.

5. The method of claim 1 wherein the benefit comprises a monetary benefit.

6. The method of claim 1 wherein the message further includes a content owner identifier; and wherein the method further comprises
recording an event related to the message in a second account corresponding to the content owner; and
associating a benefit to the second account based on the event.

7. The method of claim 1 wherein the information in the message comprises one or more tags corresponding to a content object; and wherein the method further comprises
querying, responsive to the message, an ad search system with the one or more tags;
receiving an ad or a data locator to an ad;
including the ad or the data locator to the ad in the response.

8. An apparatus comprising
a memory;
one or more processors;
logic encoded in one or more tangible media for execution and when executed operable to cause the one or more processors to:
receive, from a remote host associated with a first user, a request message including a content embedding entity identifier and information indicating an advertisement locator of an advertiser network resource, wherein the content embedding entity identifier is associated with a second user that has embedded a content object in an underlying network accessible resource accessed and rendered by the remote host on a display, and wherein the request message is generated in response to activation of an interface element rendered in proximity to the content object;
record an event related to the request message in an account corresponding to the content embedding entity identifier; and
transmit a response to the remote host, wherein the response causes the remote host to receive an ad from the advertiser network resource; and
associate a benefit to the account based on the event.

9. A method comprising:
receiving at a server, from a remote host associated with a first entity, a request including information corresponding to an advertisement resource locator, and an identifier corresponding to a second entity associated with dissemination of a content object by having embedded the content object in an underlying network accessible resource accessed and rendered by the remote host on a display, and wherein the request is generated in response to activation of an interface element rendered in proximity to the content object;
matching, by the server, one or more aspects of the advertisement resource locator to an advertiser account;
logging by the server, responsive to matching the advertisement resource locator to an advertiser account, a retrieval event in association with the advertiser account;
transmitting, by the server, the advertisement resource locator in a redirection message to the remote host;
determining by the server, for the second entity identified in the request, a share of a revenue amount attributable to retrieval event; and
crediting, by the server, an account corresponding to the second entity according to the determined share of revenue.

10. The method of claim 9 wherein the information includes the advertisement resource locator.

11. The method of claim 9 wherein the information includes a coded identifier that maps to the advertisement resource locator.

12. The method of claim 9 wherein the identifier is a content embedding entity identifier.

13. The method of claim 9 wherein the information in the request comprises one or more tags corresponding to a content object; and wherein the method further comprises
querying, responsive to the request, an ad search system with the one or more tags;
receiving an advertisement resource locator.

14. An apparatus comprising
a memory;
one or more processors;
logic encoded in one or more tangible media for execution and when executed operable to cause the one or more processors to:
  receive, from a remote host associated with a first entity, a request including information corresponding to an advertisement resource locator, and an identifier corresponding to a second entity associated with dissemination of a content object by having embedded the content object in an underlying network accessible resource accessed and rendered by the remote host on a display, and wherein the request is generated in response to activation of an interface element rendered in proximity to the content object;
  match one or more aspects of the advertisement resource locator to an advertiser account;
  log, responsive to matching the advertisement resource locator to an advertiser account, a retrieval event in association with the advertiser account;
  transmit the advertisement resource locator in a redirection message to the remote host;
  determine, for the second entity identified in the request, a share of a revenue amount attributable to retrieval event; and
  credit an account corresponding to the second entity according to the determined share of revenue.

15. A method comprising
receiving at a server, from a remote host associated with a first entity, a message including an identifier corresponding to a second entity associated with dissemination of a content object by having embedded the content object in an underlying network accessible resource accessed and rendered by the remote host on a display, and wherein the request is generated in response to activation of an interface element rendered in proximity to the content object, and information indicating data locator of a second network resource;
associating by the server, responsive to the message, a benefit to an account corresponding to the identifier; and
transmitting from the server a response to the remote host.

16. The method of claim 15 wherein the identifier is a content embedding entity identifier.

17. The method of claim 15 wherein the second network resource is a network addressable advertiser system.

18. The method of claim 15 wherein transmitting the response comprises transmitting a redirection message to the remote host, wherein the redirection message includes the data locator indicated by the information.

19. The method of claim 15 wherein the message resulted from activation of a hyperlink contained in content embedding code.

20. An apparatus comprising
a memory;
one or more processors;
logic encoded in one or more tangible media for execution and when executed operable to cause the one or more processors to:
  receive, from a remote host associated with a first entity, a message including an identifier corresponding to a second entity associated with dissemination of a content object by having embedded the content object in an underlying network accessible resource accessed and rendered by the remote host on a display, and wherein the request is generated in response to activation of an interface element rendered in proximity to the content object, and information indicating data locator of a second network resource;
  associate, responsive to the message, a benefit to an account corresponding to the identifier; and
  transmit a response to the remote host.

21. A method comprising
receiving at a server, from a remote host associated with a first entity, a search request including one or more search terms and an identifier corresponding to a second entity associated with dissemination of a content object to which the one or more search terms relate, wherein the search request resulted from activation of a hyperlink rendered by content embedding code in proximity to a content object rendered on a display of the remote host;
generating by the server, responsive to the search request, search results including one or more data locators each corresponding to a network addressable resource;
generating, by the server, a redirection link for at least one of the data locators in the search results; wherein the redirection link is operative, when activated, to cause the remote host to access the network addressable resource; and
transmitting, from the server, a response to the remote host including the redirection link;
wherein activation of the redirection link is operative to provide a benefit to the second entity corresponding to the identifier.

22. The method of claim 21 wherein the identifier is a content embedding entity identifier.

23. The method of claim 21 wherein the identifier is a content owner identifier.

24. The method of claim 21 wherein the identifier is a network application host identifier.

25. The method of claim 21 wherein the identifier is a content host identifier.

26. The method of claim 21 further comprising
receiving a request from the remote host, wherein the request includes information indicating a data locator; and wherein the request results from activation of the redirection link;
mapping the information in the request to the identifier in the search request;
associating a benefit to an account corresponding to the identifier; and
transmitting the data locator to the remote host in a redirection message.

27. The method of claim 26 further comprising
matching one or more aspects of the data locator to an advertiser account;
logging, responsive to matching the data locator to an advertiser account, a retrieval event in association with the advertiser account;
determining, for the account corresponding to the identifier, a share of a revenue amount attributable to retrieval event; and
crediting the account according to the determined share of revenue.

28. An apparatus comprising
a memory;
one or more processors;
logic encoded in one or more tangible media for execution and when executed operable to cause the one or more processors to:
  receive, from a remote host associated with a first entity, a search request including one or more search terms and an identifier corresponding to a second entity associated with dissemination of a content object to which the one or more search terms relate, wherein the search request resulted from activation of a hyperlink rendered by content embedding code in proximity to a content object rendered on a display of the remote host;

generate, responsive to the search request, search results including one or more data locators each corresponding to a network addressable resource;

generate a redirection link for at least one of the data locators in the search results;

wherein the redirection link is operative, when activated, to cause the remote host to access the network addressable resource; and transmit a response to the remote host including the redirection link;

wherein activation of the redirection link is operative to provide a benefit to the second entity corresponding to the identifier.

29. A method comprising receiving at a server, from a remote host associated with a first entity, a search request including one or more search terms and a content embedding entity identifier, wherein the search request resulted from activation of a hyperlink rendered by content embedding code in proximity to a content object rendered on a display of the remote host, and wherein the content embedding entity identifier is associated with a second entity that has embedded the content object in an underlying network accessible resource accessed and rendered by the remote host on the display;

generating by the server, responsive to the search request, search results including one or more data locators each corresponding to a network addressable resource;

generating, by the server, a link for at least one of the data locators in the search results;

wherein the link is operative, when activated, to cause the remote host to access the network addressable resource; and transmitting, from the server, a response to the remote host including the link;

wherein activation of the link is operative to provide a benefit to the second entity corresponding to the content embedding entity identifier.

30. The method of claim 29 wherein the link is a redirection link operative to cause the remote host to access the network addressable resource in a redirection process.

31. An apparatus comprising a memory;

one or more processors;

logic encoded in one or more tangible media for execution and when executed operable to cause the one or more processors to:

receive, from a remote host associated with a first entity, a search request including one or more search terms and a content embedding entity identifier, wherein the search request resulted from activation of a hyperlink rendered by content embedding code in proximity to a content object rendered on a display of the remote host, and wherein the content embedding entity identifier is associated with a second entity that has embedded the content object in an underlying network accessible resource accessed and rendered by the remote host on the display;

generate, responsive to the search request, search results including one or more data locators each corresponding to a network addressable resource;

generate a link for at least one of the data locators in the search results; wherein the link is operative, when activated, to cause the remote host to access the network addressable resource; and transmit a response to the remote host including the link;

wherein activation of the link is operative to provide a benefit to the second entity corresponding to the content embedding entity identifier.

32. The apparatus of claim 31 wherein the link is a redirection link operative to cause the remote host to access the network addressable resource in a redirection process.

* * * * *